US012704854B2

(12) United States Patent
Singh et al.

(10) Patent No.: US 12,704,854 B2
(45) Date of Patent: Aug. 11, 2026

(54) AUTOMATED PATH PARAMETER COMPUTATION IN GENERATING A NAVIGATION PATH

(71) Applicant: Deere & Company, Moline, IL (US)

(72) Inventors: Rana Shakti Singh, Ramgarh (IN); Federico Pardina-Malbran, Fort Collins, CO (US); Ryan C. Russell, Orion, IL (US); Bradley K. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 70 days.

(21) Appl. No.: 18/749,197

(22) Filed: Jun. 20, 2024

(65) Prior Publication Data

US 2025/0390104 A1 Dec. 25, 2025

(51) Int. Cl.

| | |
|---|---|
| ***G05D 1/622*** | (2024.01) |
| ***A01B 69/04*** | (2006.01) |
| ***A01D 90/10*** | (2006.01) |
| ***G05D 1/695*** | (2024.01) |
| *G05D 105/15* | (2024.01) |
| *G05D 107/20* | (2024.01) |

(52) U.S. Cl.

CPC ........... *G05D 1/622* (2024.01); *A01B 69/008* (2013.01); *A01D 90/10* (2013.01); *G05D 1/695* (2024.01); *G05D 2105/15* (2024.01); *G05D 2107/21* (2024.01)

(58) Field of Classification Search

None

See application file for complete search history.

(56) References Cited

U.S. PATENT DOCUMENTS

| | | | | |
|---|---|---|---|---|
| 7,593,798 B2 | 9/2009 | Han et al. | | |
| 8,060,306 B2 | 11/2011 | Puhalla et al. | | |
| 8,565,984 B2 | 10/2013 | Mayfield et al. | | |
| 9,014,901 B2 | 4/2015 | Wang et al. | | |
| 9,026,315 B2 | 5/2015 | Anderson | | |
| 9,404,758 B2 | 8/2016 | Cheng et al. | | |
| 10,028,442 B1 * | 7/2018 | Crosby | ................ | G05D 1/0293 |
| 11,185,006 B2 * | 11/2021 | Green | .................. | A01B 79/005 |
| 11,641,790 B2 | 5/2023 | Smith et al. | | |
| 2017/0060134 A1 * | 3/2017 | Buhler | ................. | A01B 69/008 |
| 2017/0354079 A1 * | 12/2017 | Foster | .................. | G05D 1/0276 |
| 2020/0063401 A1 | 2/2020 | Sherlock | | |
| 2023/0297116 A1 * | 9/2023 | Van Mill | ............ | G01C 21/3407 701/50 |

FOREIGN PATENT DOCUMENTS

| | | |
|---|---|---|
| EP | 3330824 A8 | 1/2019 |

* cited by examiner

*Primary Examiner* — Tamara L Weber

(74) *Attorney, Agent, or Firm* — Christopher J. Volkmann; KELLY, HOLT & CHRISTENSON PLLC

(57) ABSTRACT

A processing system identifies an obstacle in a field that is harvested by an agricultural harvester. A material transfer vehicle moves along with the agricultural harvester in order to receive harvested material from the agricultural harvester. The processing system calculates a location and offset corresponding to the obstacle and a path planning system calculates a navigation path that can be followed by the agricultural harvester and/or the material transfer vehicle so that both the agricultural harvester and the material transfer vehicle avoid the obstacle while traveling through the field.

20 Claims, 21 Drawing Sheets

AUTOMATED PATH PARAMETER COMPUTATION IN GENERATING A NAVIGATION PATH

FIELD OF THE DESCRIPTION

The present description relates to an agricultural system. More specifically, the present description relates to identifying vehicle path planning constraints and applying those constraints to generate a vehicle path for a set of paired vehicles.

BACKGROUND

There is a wide variety of different types of agricultural equipment. Some such agricultural equipment includes agricultural harvesters. Agricultural harvesters often engage crop, process that crop, and unload that crop into a material transfer vehicle, such as a tractor-pulled grain cart (for example).

Once the material transfer vehicle is filled to a desired fill level, a propulsion vehicle (such as a tractor or other vehicle) that pulls the grain cart moves the grain cart to a container, such as a semi-trailer. As the propulsion vehicle approaches the semi-trailer, the propulsion vehicle positions an unloading spout or auger on the grain cart, pulls alongside the semi-trailer, and then engages an unloading conveyor (such as an auger) on the grain cart to unload the harvested material from the grain cart into the semi-trailer.

Also, it is not uncommon for the material transfer vehicle to be loaded with harvested material from the harvester, while the harvesting operation commences. For instance, as the harvester is moving through a field, the material transfer vehicle may move to a location adjacent the harvester (e.g., alongside the harvester or behind the harvester), so the harvester can unload harvested material into the material transfer vehicle while the harvester continues to advance through the field, engaging crop. When the material transfer vehicle is loaded to a desired level, then the material transfer vehicle can move toward the container to perform an unloading operation, while another material transfer vehicle moves into position relative to the harvester, as the harvester continues to harvest crop.

Also, there are many different types of agricultural harvesters. Some such agricultural harvesters include a combine harvester, a sugarcane harvester, a cotton harvester, a forage harvester, among others. The different types of harvesters can be configured to load material into a material transfer vehicle in different ways.

The discussion above is merely provided for general background information and is not intended to be used as an aid in determining the scope of the claimed subject matter.

SUMMARY

A processing system identifies an obstacle in a field that is harvested by an agricultural harvester. A material transfer vehicle moves along with the agricultural harvester in order to receive harvested material from the agricultural harvester. The processing system calculates a location and offset corresponding to the obstacle and a path planning system calculates a navigation path that can be followed by the agricultural harvester and/or the material transfer vehicle so that both the agricultural harvester and the material transfer vehicle avoid the obstacle while traveling through the field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
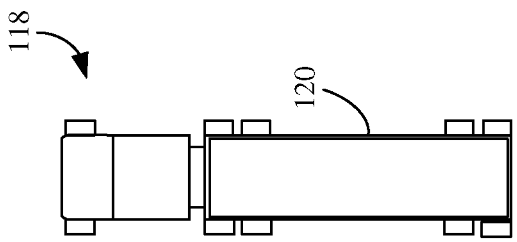
FIGS. 1, 2, 3, 4, 5A, 5B, 5C, 5D, 5E, 6, 7, 8, 9, and 10 are pictorial illustrations showing different examples of an agricultural system in which an agricultural harvester is harvesting crop and in which the crop is transferred to a container, such as a semi-trailer.
Figure 1:
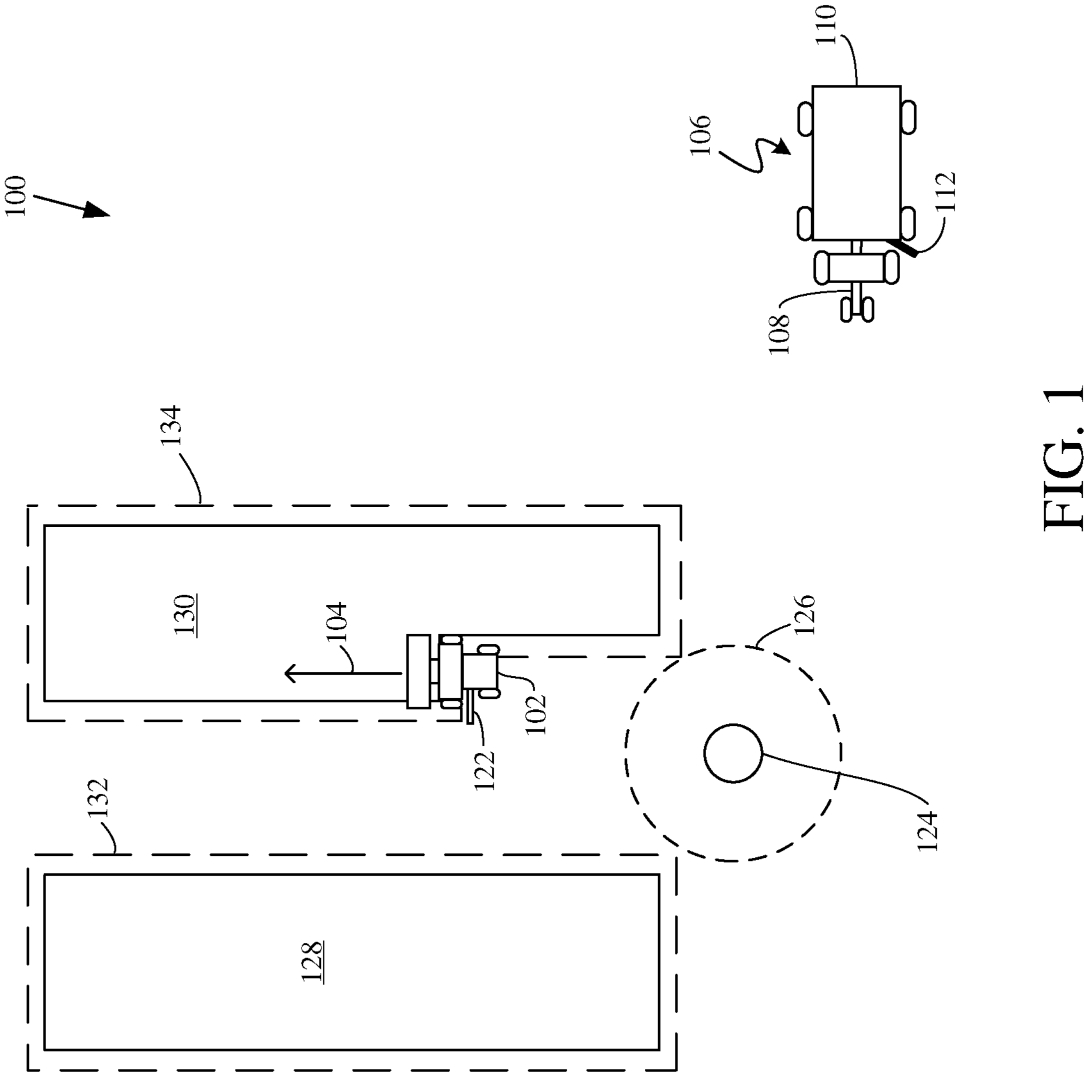

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

As discussed above, it is not uncommon for an agricultural harvester to unload material into a material transfer vehicle which, itself, moves the material to a container (such as a semi-trailer) and unloads the material into the container. During this process, it can be difficult for the operators of the agricultural harvester and the material transfer vehicle to maintain a desired spatial relationship relative to one another so that, during harvesting, material can be loaded into the material transfer vehicle from the harvester without spillage. Therefore, some current systems have automated some portions of the operation.

For instance, a navigation system on the agricultural harvester may automatically control the agricultural harvester to follow a navigation path through a field. Similarly, a control system may communicate information between the agricultural harvester and the material transfer vehicle to automatically navigate the material transfer vehicle to follow the agricultural harvester in a desired spatial relationship. The control system may use sensors to monitor the fill level of material in the material transfer vehicle to determine when the landing point of material in the material transfer vehicle should be shifted.

For instance, assuming that crop material is loaded from a harvester into a grain cart starting at the front of the grain cart, then when a desired fill level is reached in the front of the grain cart, the landing point in the grain cart should be moved rearwardly and the filling operation should continue. Therefore, some agricultural systems include control systems that automatically monitor the fill level of material in the grain cart and, when it reaches a desired level, nudge the material transfer vehicle in one direction or the other (e.g., forward or rearward) relative to the agricultural harvester to change the landing point of material in the grain cart. As one example, when a front-to-back fill strategy is used, the material transfer vehicle is first positioned automatically relative to the agricultural harvester so that the landing point of crop material in the grain cart is toward the front of the grain cart. Then, as the front of the grain cart is filled to a desired fill level, the material transfer vehicle is automatically nudged forward relative to the harvester to shift the landing point rearward in the grain cart. This continues until the grain cart is filled to a desired fill level (e.g., according to a desired fill profile) from front to back.

These types of automated systems can encounter difficulties. For instance, there may be obstacles in the field being harvested, such as waterways, drains, rocks, trees, muddy spots, posts, ditches, etc. When a harvester is loading harvested material into a material transfer vehicle, and the material transfer vehicle is following the harvester, then even though the harvester does not collide with the obstacle, the material transfer vehicle may collide with the obstacle.

Therefore, the present description proceeds with respect to a system which automatically determines vehicle path planning constraints that are used to plan a navigation path for one or more vehicles in an agricultural system such as a navigation path for an agricultural harvester or for a material transfer vehicle or for both. In one example, the system identifies the location of objects in a field and calculates an offset or buffer around each of those objects. The present system then provides the location and offset for the objects (as path planning constraints) to a path planning system which plans a path for the agricultural harvester that not only controls the agricultural harvester to avoid the obstacle, but also allows a paired vehicle (such as a material transfer vehicle) to follow the agricultural harvester in a desired spatial relationship relative to the agricultural harvester and to also avoid the obstacle.

Also, in one example, the present description describes a system which identifies the types of vehicles that are being controlled and characteristics of those vehicles (such as the travel speed, the weight of the vehicles, the load in the vehicles, among other things) and computes a turning radius corresponding to the vehicles. The turning radius is also provided as a path planning constraint to the path planning system so that the navigation path can be calculated accounting for the turning radius corresponding to each of the vehicles in the agricultural system.

Further, the different vehicles may have different destinations. Therefore, the present description proceeds with respect to a system that identifies a location and offset (e.g. lateral offset, in-line offset, and/or other offset) corresponding to the destination, based upon the type of destination and the type of vehicle approaching the destination, and provides the location and offset corresponding to the destination as a path planning constraint to the path planning system. The path planning system then generates a navigation path to the destination, accounting for the destination location and offset.

By way of example, a material transfer vehicle may include a grain cart with an unloading auger, wherein the auger moves material through an unloading spout. The system of the present description may identify the dimensions of the grain cart and spout and compute an offset relative to a semi-trailer (e.g., the destination) accounting for the dimensions of the grain cart and the spout, so that the spout is centered over the semi-trailer during an unloading operation. Similarly, the present system can identify a direction of approach that indicates a direction from which the vehicle is to approach the container. By way of example, if a grain cart is to unload material into a semi-trailer, it may be that the terrain on one side of the semi-trailer is unsuitable for travel (e.g., it is muddy, uneven, rocky, etc.). In that case, the present system computes the approach direction based upon the location of the semi-trailer, the characteristics of the terrain around the semi-trailer (which indicates that one side of the semi-trailer is unsuitable for machine travel), the location of the spout on the grain cart (e.g., the side of the grain cart from which the spout is deployed), and the dimensions of the spout. Such information is provided as a path planning constraint to a path planning system which generates a navigation path that can be followed by the material transfer vehicle to approach the destination (e.g., to approach the semi-trailer).

FIG. 1 is a pictorial illustration showing one example of an agricultural system 100 in which a harvester 102 is moving through a field in a direction indicated by arrow 104. A material transfer vehicle 106 includes a propulsion vehicle (e.g., a tractor) 108 and a grain cart 110. Grain cart 110 is shown having a spout 112 that houses a conveyor (such as an auger) that is used to convey material from the interior of grain cart 110 into a container.

In the example shown in FIG. 1, grain cart 110 can receive harvested material from harvester 102. Once grain cart 110 is filled with harvested material from harvester 102, propulsion vehicle 108 travels along a path toward a container 118. In the example shown in FIG. 1 the container is a semi-truck 118, which includes a semi-trailer 120. Tractor 108 pulls the grain cart 110 alongside semi-trailer 120 so that the conveyor in spout 112 can be engaged to transfer material from grain cart 110 into semi-trailer 120.

In order to obtain harvested material from harvester 102, tractor 108 pulls grain cart 110 alongside harvester 102 during the harvesting operation. Harvester 102 is shown with an unloading spout 122 that unloads harvested material from a clean grain tank on harvester 102. Therefore, tractor 108 pulls grain cart 110 alongside harvester 102 and positions grain cart 110 so that spout 122 is unloading material from the clean grain cart in harvester 102 into grain cart 110.

Some current systems automate parts of the unloading process. Therefore, in some systems, an automated control system pairs harvester 102 with material transfer vehicle 106 while material transfer vehicle 106 is being filled with harvested material. Once paired, the automated control system automatically controls material transfer vehicle 106 to follow harvester 102 (e.g. to stay in a desired spatial relationship or position relative to harvester 102) so that material can be transferred from harvester 102, through spout 122, to clean grain cart 110. In some examples, the material is loaded into grain cart 110 according to a desired fill pattern, such as a front-to-back fill pattern, a back-to-front fill pattern, a multi-pass fill pattern, etc. In those examples, the control system monitors the fill level of material in grain cart 110 at a current landing point. When the fill level at that landing point reaches a desired fill level, then the control system generates control signals to nudge propulsion vehicle 108 in a forward or reverse direction relative to harvester 102 to change the landing point of material in grain cart 110, based on the desired fill pattern. This continues until material is loaded into grain cart 110 according to a desired fill profile which indicates the desired level or amount of material in grain cart 110 along the front-to-back axis of grain cart 110.

In order to perform this type of automated unloading process, the control system includes a path planning system which obtains vehicle path planning constraints and generates a navigation path based upon the path planning constraints. The navigation path can be for harvester 102, material transfer vehicle 106, or for both vehicles 102 and 106.

For instance, FIG. 1 shows that the field in which harvester 102 is operating includes an obstacle 124. Obstacle 124 may be a pole, a rock, a rock pile, water, mud, an area of undesirable terrain or topography, etc. One of the path planning constraints may be an offset (in FIG. 1 the offset is defined by dashed line 126) around obstacle 124. The obstacle offset defines an area that the path planning system may avoid when generating a navigation path for material transfer vehicle 106. Also, in FIG. 1, the field has a plurality of unharvested areas 128 and 130. Each of those unharvested areas also has an offset 132 and 134, respectively. The offsets 132 and 134 may also be provided to the path planning system and are used to generate a navigation path for material transfer vehicle 106 so that material transfer vehicle 106 avoids unharvested crop. As described elsewhere herein, the path planning system may have an operator-configurable setting which allows a navigation path to be generated where material transfer vehicle 106 is permitted to run through a portion of unharvested crop or a portion of another obstacle (e.g., through mud or over uneven terrain, etc.).

The offsets corresponding to obstacle 124 and corresponding to the unharvested areas 128 and 130 may be manually set by an operator of material transfer vehicle 106 or by another user. In such cases, offsets may be set inaccurately and preclude the path planning system from automatically generating a navigation path that is drivable for material transfer vehicle 106, or for harvester 102, given the offsets. In the example shown in FIG. 1, it can be seen that the offset 126 around obstacle 124 is so large that the offset 126 intersects with the offsets 132 and 134 corresponding to the unharvested areas 128 and 130, respectively. Thus, when offset 126 is used as a planning constraint, offset 126 precludes a path planning system from generating a path by which material transfer vehicle 106 can approach harvester 102 from the rear, to move into a position for receiving material from harvester 102.

Figure 2:
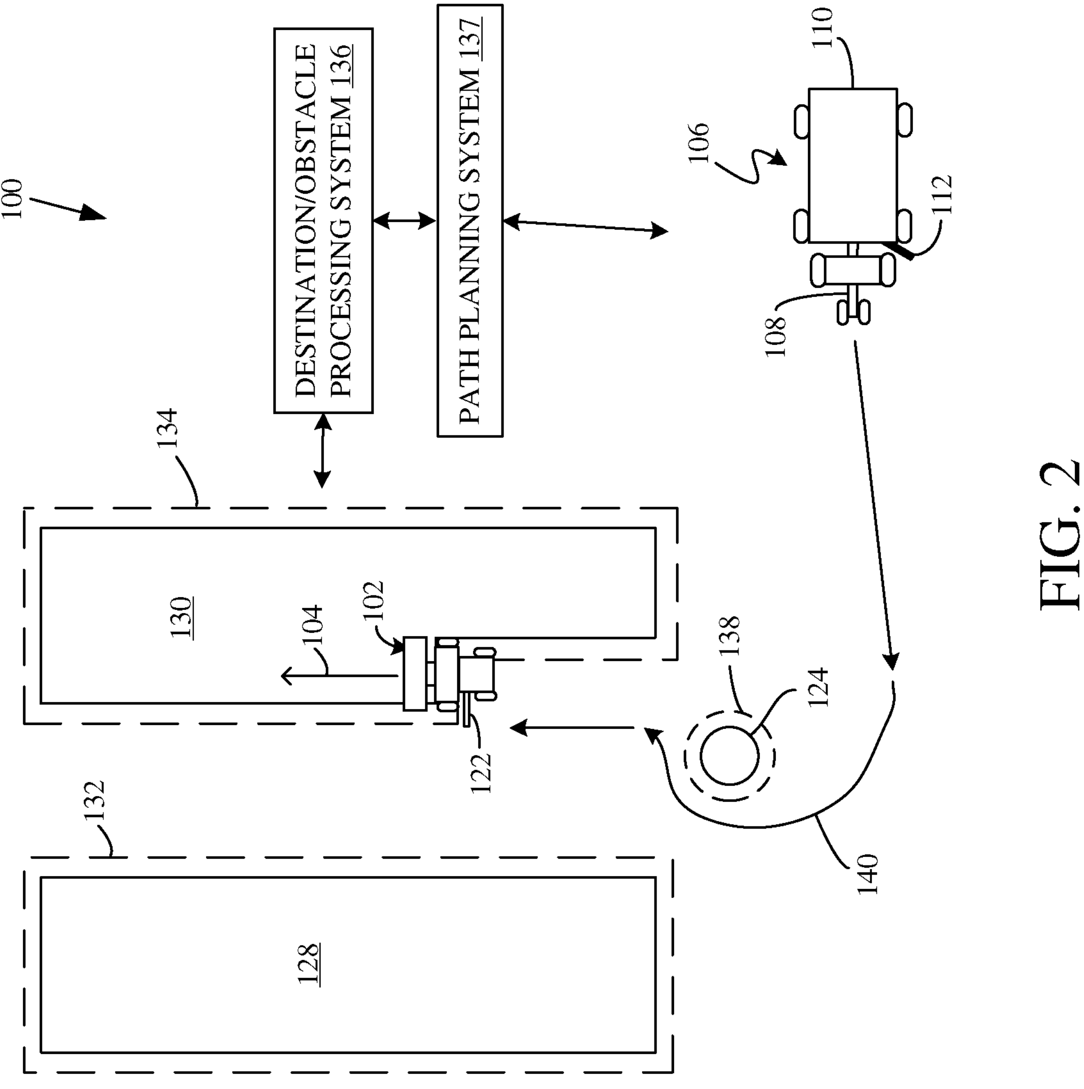

FIG. 2 is similar to FIG. 1, and similar items are similarly numbered. However, FIG. 2 shows that agricultural system 100 includes a destination/obstacle processing system 136. Destination/obstacle processing system 136 can be deployed on material transfer vehicle 106, on harvester 102, on other machines, or in a remote server environment (e.g., in the cloud). System 136 can be distributed among a plurality of different locations as well. In the example shown in FIG. 2, destination/obstacle processing system 136 automatically generates path planning constraints and provides those constraints to a path planning system 137 which automatically generates a travel path for material transfer vehicle 106 so that material transfer vehicle 106 can assume a position alongside harvester 102 (e.g. maintain a desired spatial relationship relative to harvester 102) to receive harvested material from harvester 102. In the example shown in FIG. 2, destination/obstacle processing system 136 may receive or detect a location of obstacle 124, and a set of field characteristics indicating the locations of unharvested areas 128 and 130, as well as the current path 104 for harvester 102. Destination/obstacle processing system 136 can then either identify the type of obstacle 124 automatically, or obtain the type of obstacle 124 through manual input, or in other ways. Based upon the type of obstacle 124, and any other desired parameters, destination/obstacle processing system 136 can automatically generate an offset 138 corresponding to obstacle 124, as a path planning constraint. The offset 138 is more accurate than offset 126. Therefore, the automatically generated offset 138 leaves space for a path planning system 137 to generate a navigation path 140 for material transfer vehicle 106 to follow in order to reach a destination alongside harvester 102. In the example shown in FIG. 2, because the offset 138 is set much closer to obstacle 124, the travel path 140 can traverse around obstacle 124 and still approach harvester 102 to attain the desired position, or spatial relationship relative to harvester 102.

Destination/obstacle processing system 136 can calculate the offset 138 in a wide variety of different ways, based upon a wide variety of different parameters, some of which are described elsewhere herein. For example, if obstacle 124 is a power pole, then system 136 can obtain the dimensions of obstacle 124 and calculate the turning radius of the material transfer vehicle 106, System 136 can then calculate the offset 138 as a path planning constraint so that a path planning system 137 can generate a navigation path for material transfer vehicle 106 such that material transfer vehicle 106 can turn around obstacle 124 yet avoid contact with obstacle 124.

Figure 3:
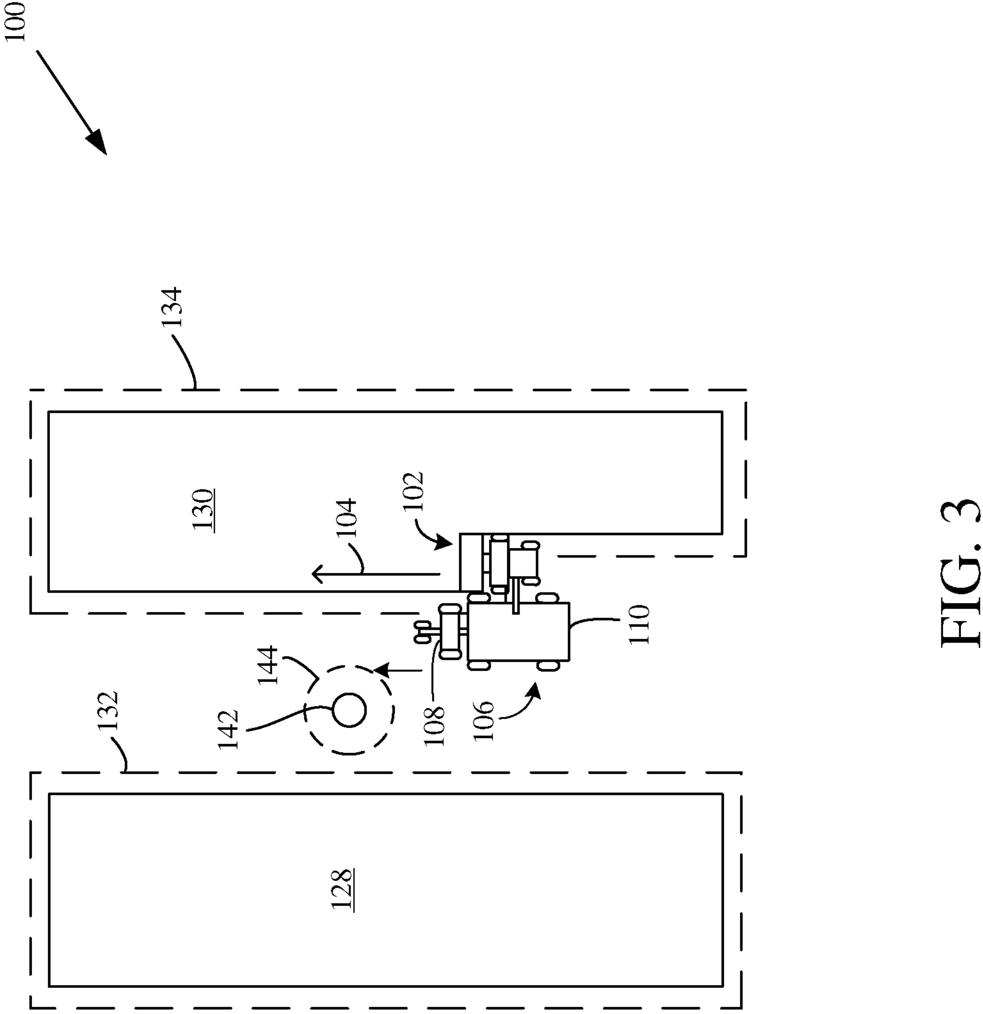

These and other criteria are discussed in greater detail elsewhere herein. FIG. 3 illustrates another example in which a manual offset precludes a path planning system from planning a path for material transfer vehicle 106 (and/or harvester 102) in order to avoid an obstacle. Some items in FIG. 3 are similar to those shown in FIG. 2, and they are similarly numbered. FIG. 3 shows that an obstacle 142 is located in the field being harvested by harvester 102. The manually entered offset 144 is sufficiently large that, if harvester 102 continues along its current path 104, there will be insufficient room for material transfer vehicle 106 to maintain its current position relative to harvester 102 without intersecting offset 144.

Figure 4:
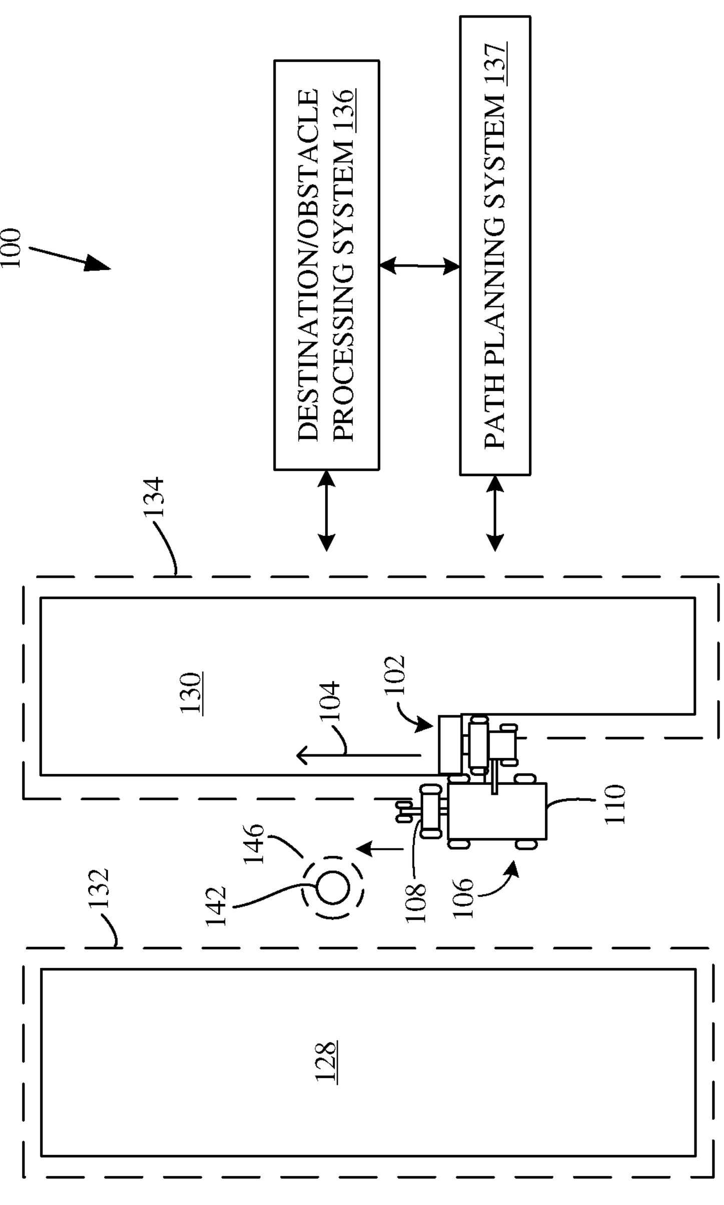

FIG. 4 is similar to FIG. 3, and similar items are similarly numbered. However, in FIG. 4, destination/obstacle processing system 136 is included in agricultural system 100. Destination/obstacle processing system 136 obtains the location and type of obstacle 142 and can obtain other criteria as well. Destination/obstacle processing system 136 automatically computes a more accurate offset value 146. System 136 outputs offset value 146 as a path planning constraint to a path planning system 137. With the more accurate offset value 146, the path planning system 132 can generate a path for harvester 102 and/or material transfer vehicle 106 so that, even when staying in a desired spatial relationship relative to harvester 102, material transfer vehicle 106 avoids obstacle 142 and its corresponding offset 146.

It will also be noted that destination/obstacle processing system 136 can also identify scenarios in which a path is identified by the operator as drivable, but the path should not be driven because of environmental, obstacle, or machine characteristics. For instance, where the operator has set an offset value 146 shown in FIG. 4 for a water hole, system 136 may determine that the offset should be larger, such as

144 shown in FIG. 3, due to the nature of the obstacle and detected or estimated muddy terrain around the obstacle 142. In such a scenario, the larger offset value 144 is used as a path planning constraint, even though the operator entered offset value 146, and vehicle(s) 102, 110 can be routed in other ways.

Figure 5A:
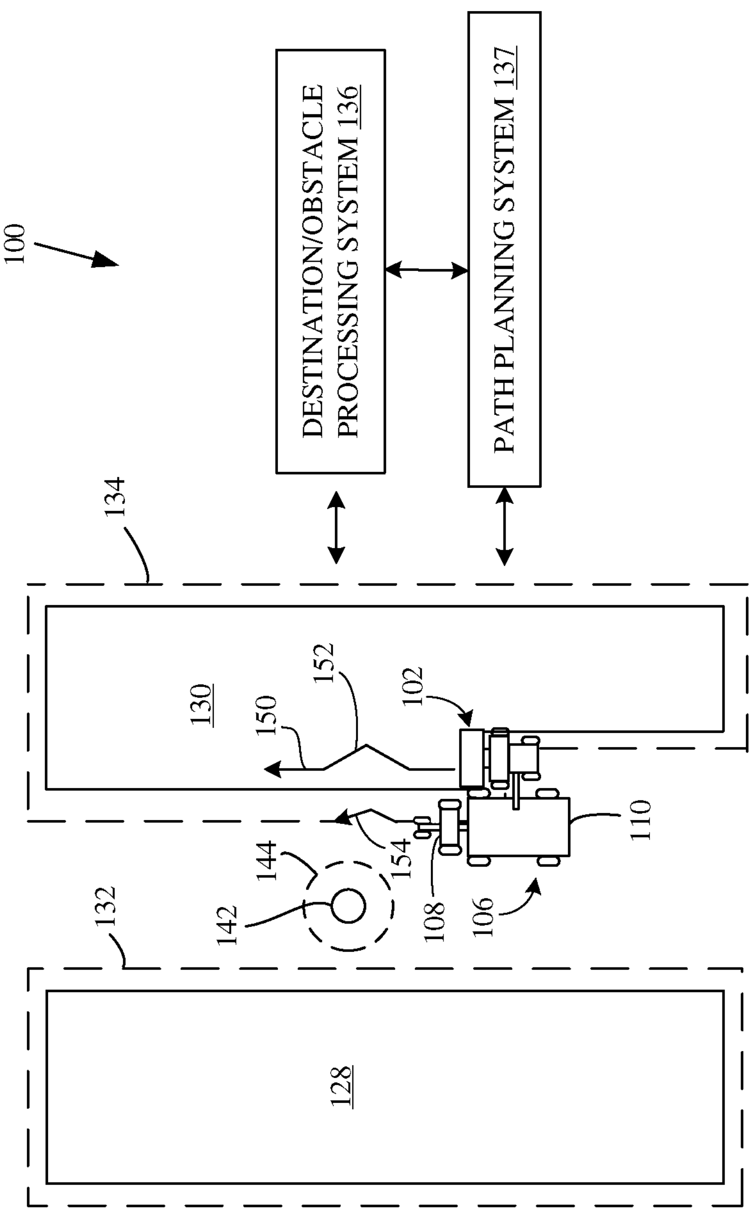

FIGS. 5A-5E show examples of how path planning system 137 can generate different navigation paths based on constraint(s) introduced by object 142 and offset 144. FIG. 5A is similar to FIG. 4 and similar items are similarly numbered. However, in FIG. 5A, instead of changing the offset 144 for obstacle 142 (or in addition to changing offset 144), the path planning system 137 generated a modified navigation path 150 for harvester 102. The modified navigation path 150 includes a deviation portion 152 which deviates the path of agricultural harvester 102 more away from obstacle 142 than the previous path shown in FIG. 4. Therefore, if material transfer vehicle 106 is paired with a harvester 102 so that material transfer vehicle 106 is maintaining a desired spatial relationship relative to harvester 102, then the travel path of material transfer vehicle 106 will also deviate away from obstacle 142, as indicated by arrow 154. For instance, destination/obstacle processing system 136 computes the path planning constraints and the path planning system 137 generates the travel path 150 for harvester 102 to account for the material transfer vehicle 106 as well as obstacle 142 and its offset 144. Given the path planning constraints, the path planning system 137 computes the travel path 150 for harvester 102 so that it is far enough away from obstacle 142 that when material transfer vehicle 106 is in the desired position relative to harvester 102, material transfer vehicle 106 will also avoid obstacle 142 and its offset 144.

As is described in greater detail elsewhere herein, destination/obstacle processing system 136 can obtain machine parameters corresponding to vehicle 106 and harvester 102 to identify a desired position of material transfer vehicle 106, relative to harvester 102. Further, destination/obstacle processing system 136 obtains dimension information and turning radius information corresponding to material transfer vehicle 106 and harvester 102 and calculates the path planning constraints which can be used to generate the travel path 150 for harvester 102 to accommodate both material transfer vehicle 106 and obstacle 142 and offset 144. Calculating the travel path 150 for harvester 102, considering both material transfer vehicle 106 and obstacle 142 is described in greater detail elsewhere herein.

Figure 5B:
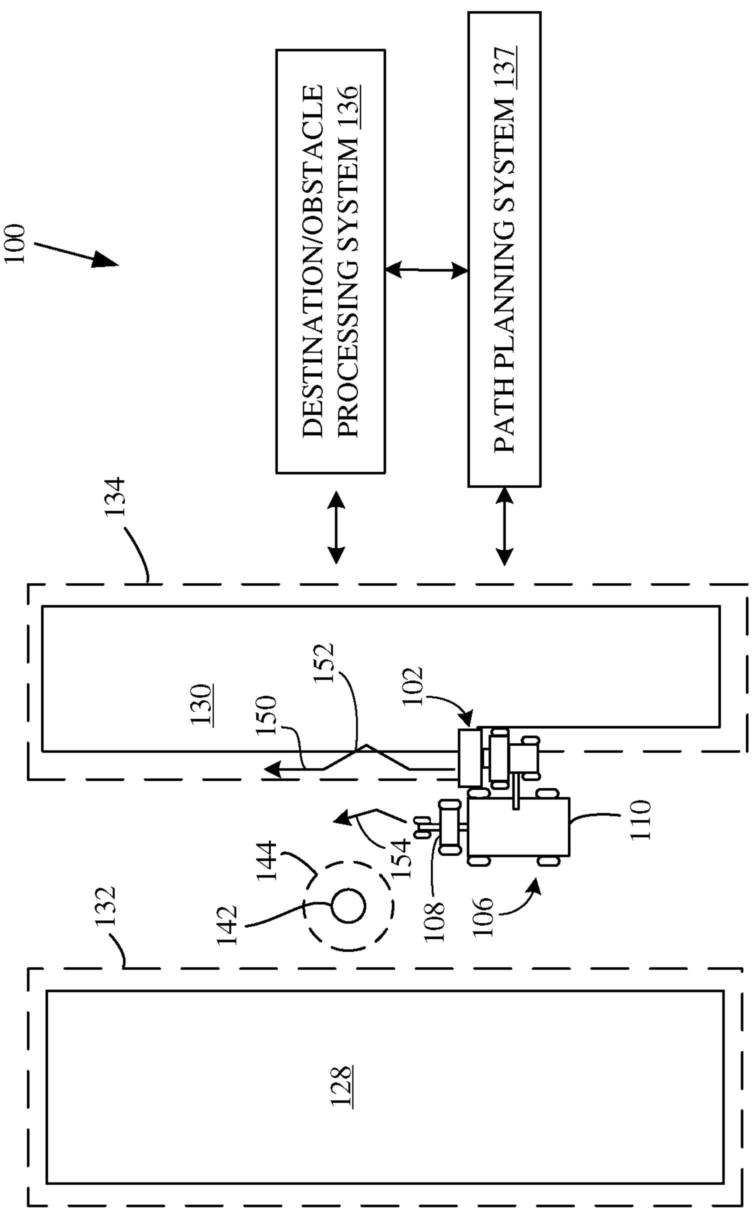

FIG. 5A shows an example in which path planning system 137 planned the path 150 with deviation section 152 which deviates away from obstacle 142 sufficiently that material transfer vehicle 106 (when following path 154) will also deviate around obstacle 142 and offset 144. In the example shown in FIG. 5A, this may mean that material transfer vehicle 106 drives over unharvested crop 130 in the area of its deviation away from obstacle 142. In such a scenario, it is assumed that path planning system 137 includes a setting that allows one or more of the vehicles to drive over unharvested crop. Such a setting may be set by an operator or may be set in other ways. For instance, the setting may be provided in terms of a path planning constraint where, when the constraint exists, then the navigation path will be planned so that neither of the vehicles drives over standing crop. However, where no such constraint exists, then the navigation path can be planned even though it means that a vehicle following the navigation path will travel over some portion of unharvested crop or some portion of an obstacle, etc. Therefore, in the scenario illustrated in FIG. 5A, it is assumed that path planning system 137 can plan navigation paths 150 and 154 which allow one or more of the vehicles (e.g., in the example shown in FIG. 5A material transfer vehicle 106) to travel over unharvested crop 130. FIG. 5B is similar to FIG. 5A, and similar items are similarly numbered. However, FIG. 5B shows that path planning system 137 has planned the path 150 for agricultural harvester 102 to accommodate the deviation 152, but still avoid having material transfer vehicle 106 traveling over unharvested crop 130. As can be seen in FIG. 5B, harvester 102 is harvesting a half header width. Therefore, material transfer vehicle 106 is further spaced away from the boundary of unharvested crop 130 than if harvester 102 were harvesting a full header width of unharvested crop 130. Because harvester 102 is harvesting a half header width of crop, then, when harvester 102 deviates as indicated by 152, this allows material transfer vehicle 106 to also deviate in the same direction, without traveling over unharvested crop 130. Thus, even where path planning system 137 is provided with a constraint indicating that material transfer vehicle 106 should not be allowed to drive over unharvested crop, path planning system 137 can generate a navigation path allowing harvester 102 to only harvest a half header width so that, as harvester 102 approaches obstacle 142 and offset 144, harvester 102 can deviate as shown at 152 and material transfer vehicle 106 can also correspondingly deviate around obstacle 142 and offset 144 without driving on unharvested crop 130.

Figure 5C:
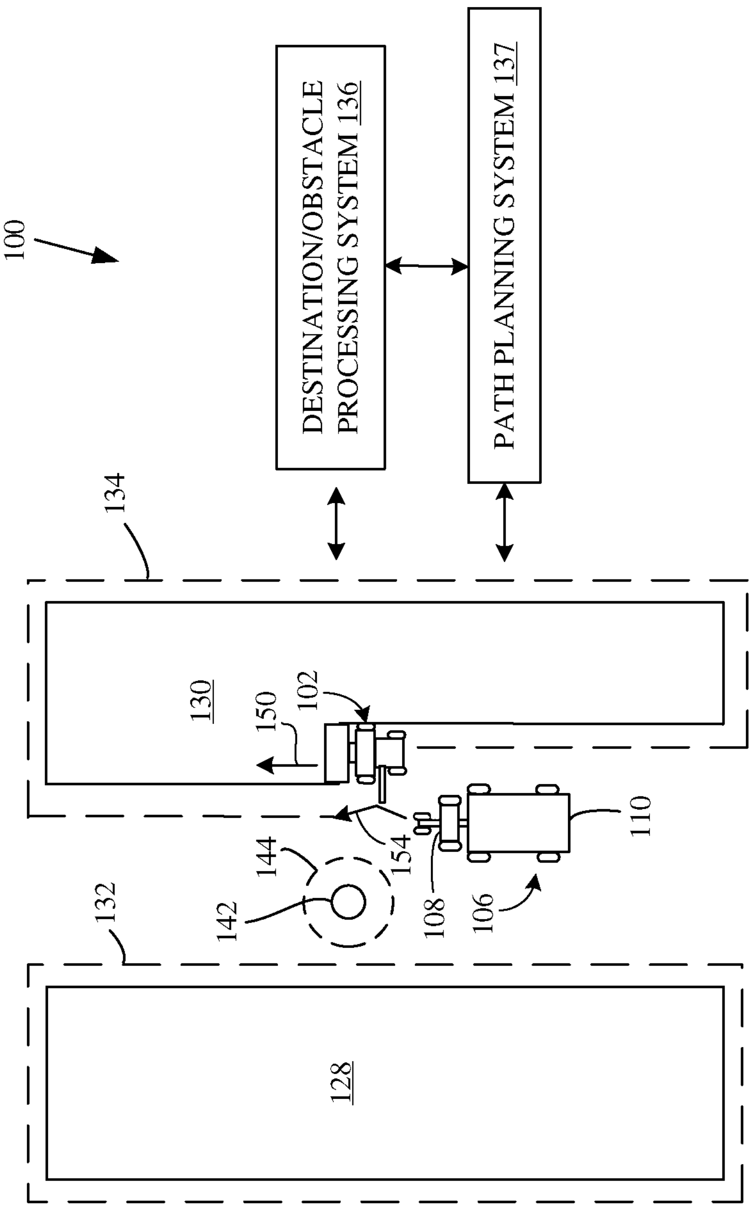
Figure 5D:
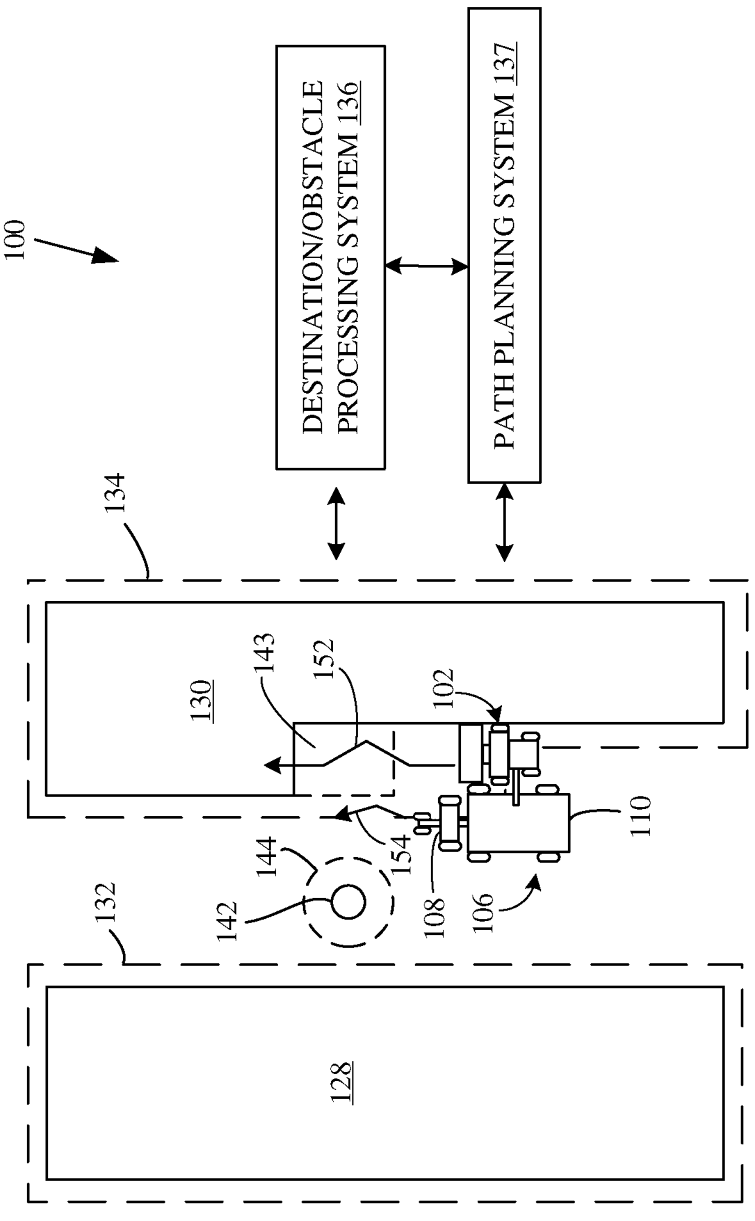

FIG. 5C and FIG. 5D show another example of a navigation path that can be generated by path planning system 137 for harvester 102 and material transfer vehicle 106 in order to both avoid obstacle 142 and its corresponding offset 144 and also avoid driving on unharvested crop 130. FIG. 5C shows that, in order to accommodate the constraints of diverting around obstacle 142 and offset 144, but also accommodate the constraint that material transfer vehicle 106 will not drive over unharvested crop 130, path planning system 137 generates a travel path 150 for harvester 102 which includes traveling forward in the direction of arrow 150 to harvest crop 130 past obstacle 142 and thus harvest a clearance area (143 in FIG. 5D).

In this way, crop has been harvested to generate clearance area 143 so both vehicles 102 and 106 can deviate around obstacle 142 and offset 144 (as indicated by arrows 152 and 154), while maintaining the desired spatial relationship or position relative to one another, without driving over any unharvested crop.

The navigation path for material transfer vehicle 106, by contrast, calls for material transfer vehicle 106 to stop and wait at a position short of obstacle 142 and offset 144 while harvester 102 continues forward to harvest clearance area 143. Then, as shown in FIG. 5D, the navigation path for harvester 102 calls for harvester 102 to back up to the position shown in FIG. 5D to assume the desired spatial relationship (or position) relative to material transfer vehicle 106 so that material can be transferred from harvester 102 into grain cart 110. Then, the navigation path for both vehicles 102 and 106 is as shown by arrows 152 and 154 in FIG. 5D. Both vehicles 106 and 102 can thus deviate around obstacle 142 and offset 144 without either of the vehicles driving over unharvested crop.

Figure 5E:
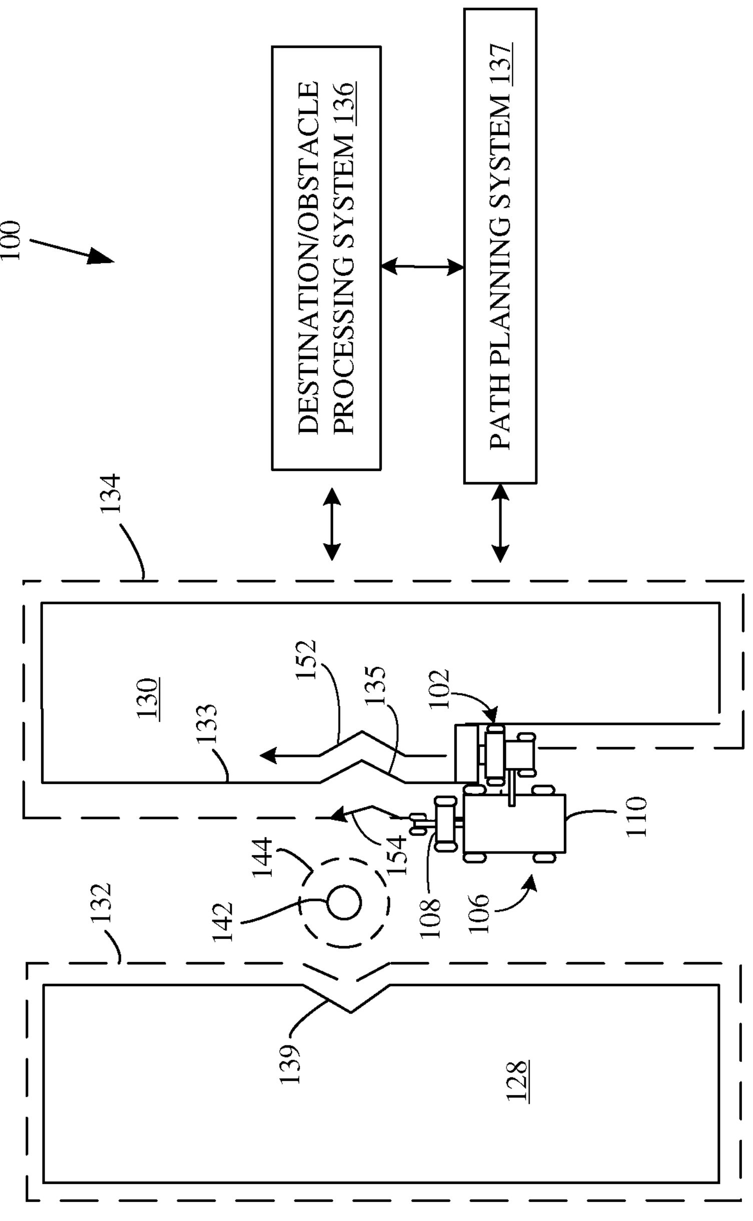

FIG. 5E shows yet another example of how path planning system 137 generates a navigation path for one or more of vehicles 102 and 106 so that the vehicles can avoid obstacle 142 and offset 144 without driving over any unharvested crop. In FIG. 5E, it is assumed that path planning system 137 generated a navigation path for harvester 102, when harvester 102 made a breakthrough pass dividing unharvested areas 128 and 130, and circumnavigating obstacle 142 and offset 144. The process of making the breakthrough pass, and navigating around offset 144, modified the boundary 133 of unharvested portion 130 so that boundary 133 includes a deviation or indent portion 135 which follows the path of harvester 102 as it navigated around offset 144. During subsequent passes through the field, harvester 102 continued along the boundary represented by indent portion 135 so that, during a subsequent pass, when material transfer vehicle 106 is driving alongside harvester 102, material transfer vehicle 106 can also deviate (as indicated by arrow 154) as agricultural harvester 102 follows the deviation portion 135. Therefore, both vehicles 102 and 106 can deviate around offset portion 144 without either vehicle driving over any unharvested crop.

FIG. 5E also shows that, during a subsequent pass, as harvester 102 traveled around offset 104 on the side of unharvested crop 128, harvester 102 modified the boundary of unharvested portion 128 in a similar fashion as deviation portion 135, and as illustrated by 9 deviation portion 139. Therefore, path planning system 137 can also generate a navigation path for a harvester 102 and material transfer vehicle 106 to harvest along the boundary of unharvested portion 128, to deviate around offset portion 144, without the vehicles driving over any unharvested material.

Figure 6:
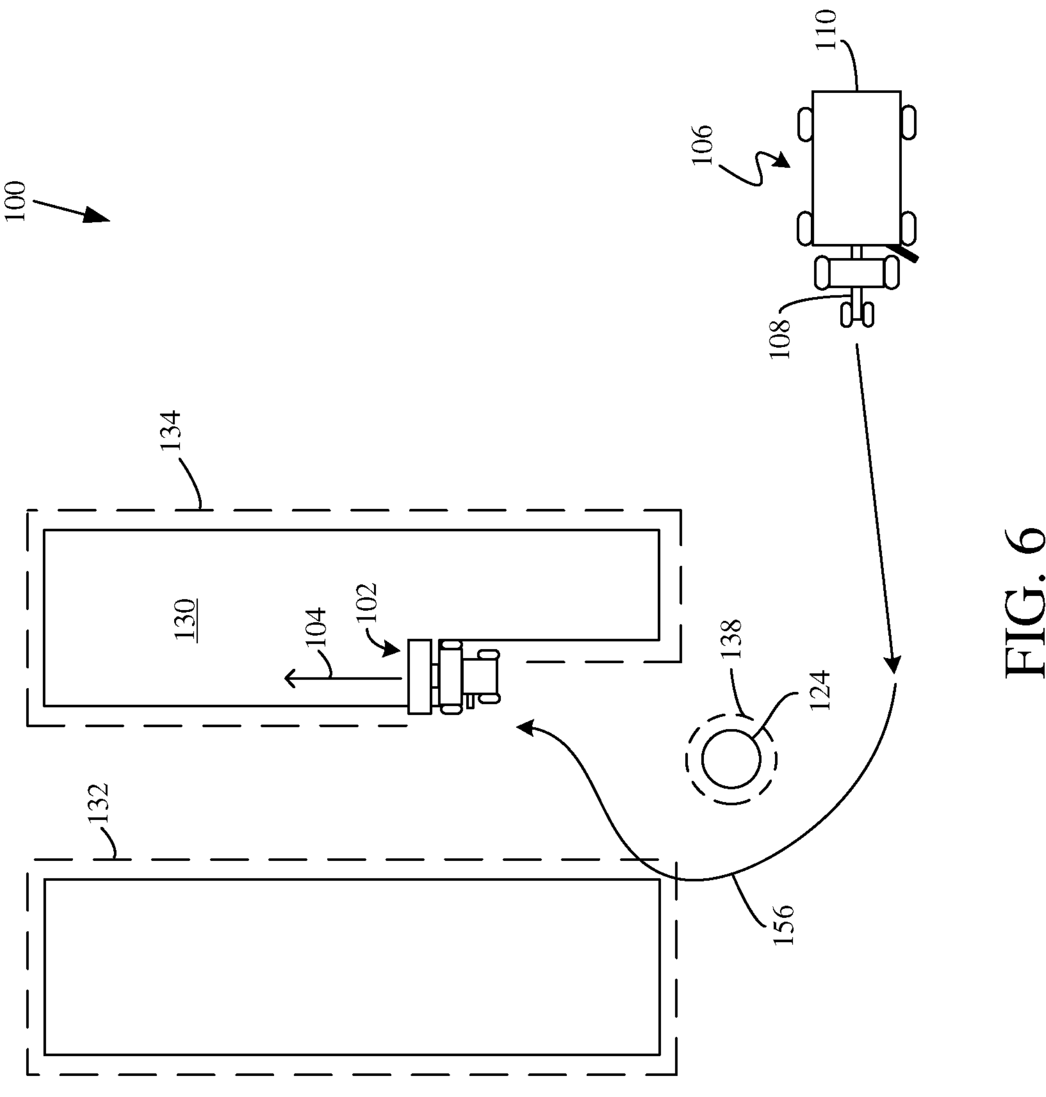

FIG. 6 is similar to FIG. 2, and similar items are similarly numbered. However, FIG. 6 illustrates an example in which the turning radius of material transfer vehicle 106 has been manually entered or entered in another way in which it is inaccurate. In FIG. 6, the turning radius of material transfer vehicle 106 has been estimated so that the navigation path of material transfer vehicle 106 cannot be calculated in a way in which material transfer vehicle 106 travels around obstacle 104 and also avoids the offset 132 for the unharvested portion 128 of the field. Instead, as can be seen in FIG. 6, the navigation path 156 that has been computed for material transfer vehicle 106 intersects with the offset 132 of unharvested portion 128 given the estimated turning radius of material transfer vehicle 106 around obstacle 124 and its offset 138.

Figure 7:
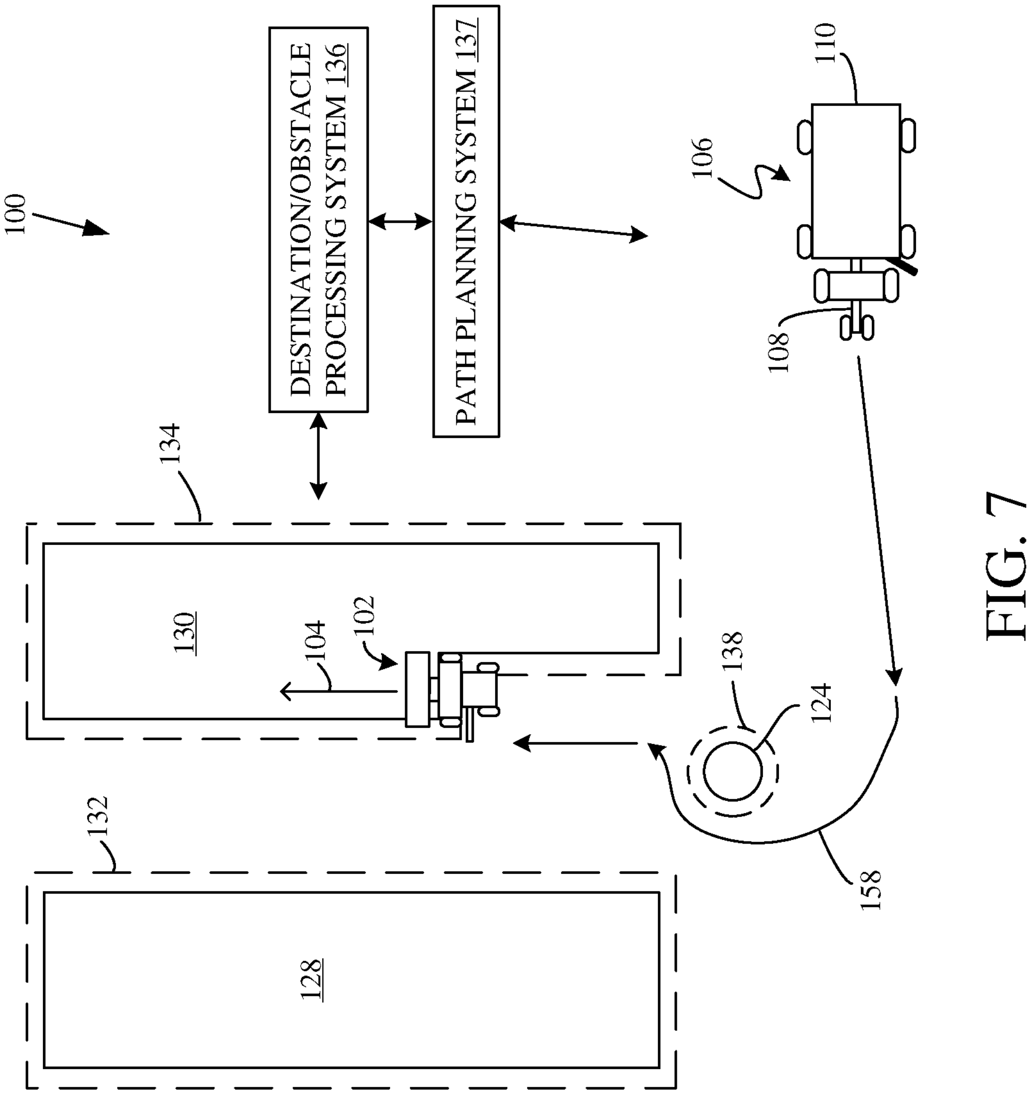

FIG. 7 is similar to FIG. 6 and similar items are similarly numbered. However, in FIG. 7, destination/obstacle processing system 136 detects the type of equipment in material transfer vehicle 106 and other parameters that may affect the turning radius of vehicle 106, such as its ground speed, weight, load (e.g., the load on grain cart 110), the wheelbase, the types of tires, field characteristics (like mud, slope, etc.), among other things, and calculates the turning radius of vehicle 106. In the example shown in FIG. 7, the turning radius is calculated more accurately and provided to the path planning system 137 so that a new navigation path 158 can be calculated for material transfer vehicle 106. With the new navigation path 158, material transfer vehicle 106 can navigate around obstacle 124 without crossing either the offset 138 for obstacle 124 or the offset 132 for the unharvested field portion 128.

It will also be noted that destination/obstacle processing system 136 can identify navigation paths input by an operator as being paths that should not be driven. For instance, it may be that an operator may overestimate the ability of tractor 108 to make a tight turn as indicated by 158 in FIG. 7. However, system 136 may identify the speed and load in material transfer vehicle 106 and calculate a different turning radius, such as that shown in FIG. 6. In response, path planning system 137 can generate a navigation path for material transfer vehicle 106 along a different route, given the newly calculated turning radius for material transfer vehicle 106.

Figure 8:
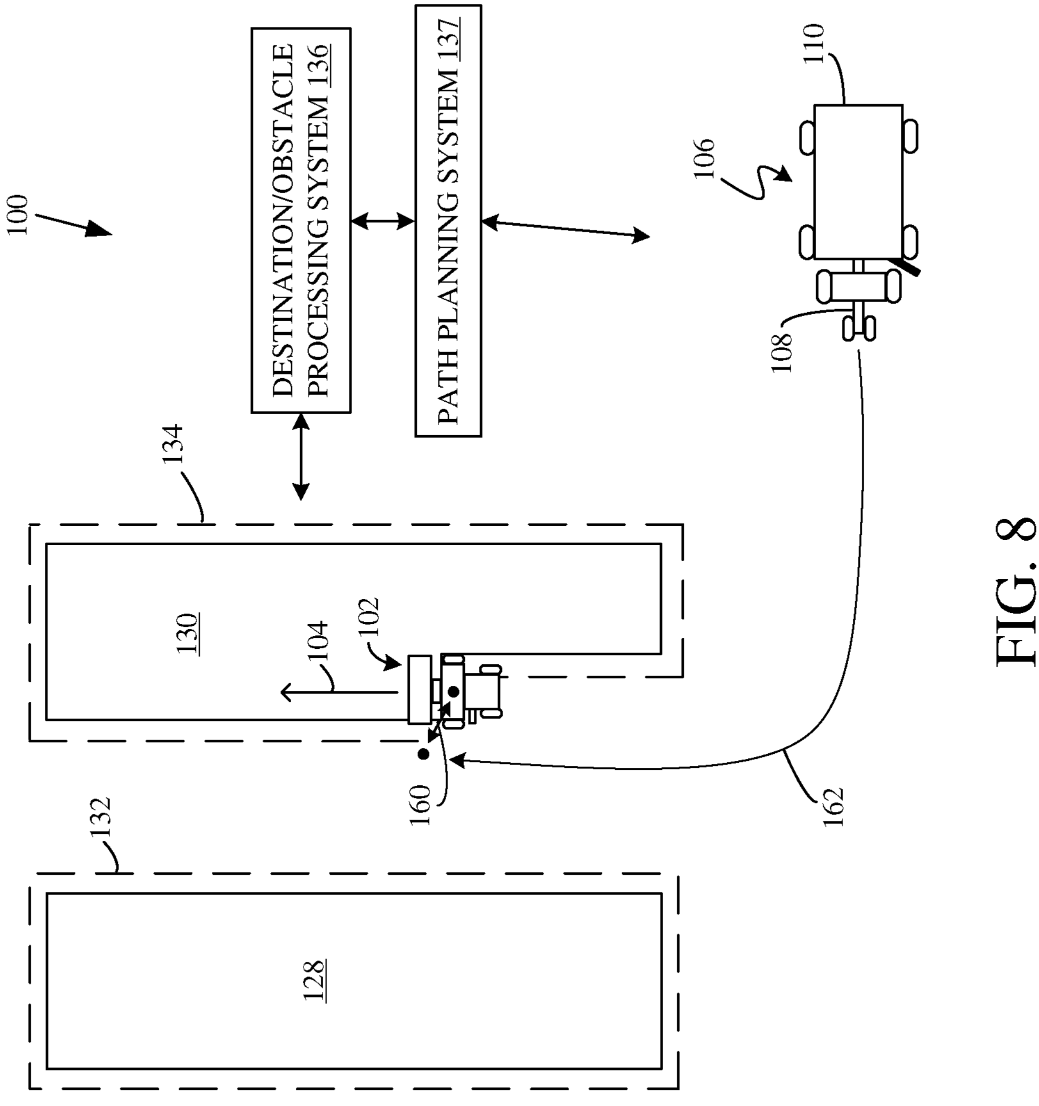

FIG. 8 is similar to FIG. 7 and similar items are similarly numbered. However, in FIG. 8, destination/obstacle processing system 136 obtains information about the destination of one or more of the vehicles in agricultural system 100 and calculates a location, and an offset, as well as a direction of the offset, corresponding to that destination. Destination/obstacle processing system 136 can obtain information through operator inputs, through automated detection, or in other ways. Destination/obstacle processing system 136 can obtain information such as the type of destination, the dimensions of the destination, the location of the destination, the field characteristics at the destination (such as whether a portion of the field is muddy, rocky, uneven, etc.), among other things. Similarly, destination/obstacle processing system 136 can obtain information about the vehicle (e.g., harvester 102 or material transfer vehicle 106) that is proceeding to that destination. The information can include such things as the type of vehicle, the dimensions of the vehicle, the dimensions of the unloading equipment for the vehicle (e.g., the dimensions of the spout, etc.), among other things. Based upon that information, destination/obstacle processing system 136 calculates destination information, such as a location of the destination, an offset, and a direction of the offset relative to the destination (e.g., extending away from the destination in a single direction or in multiple directions). That destination information can be output as path planning constraints and used by a path planning system 137 to generate a navigation path for the vehicle to arrive at a proper location relative to the destination. FIG. 8 shows that material transfer vehicle 106 is traveling toward agricultural harvester 102. Therefore, the destination of material transfer vehicle 106 is harvester 102. Destination/obstacle processing system 136 thus calculates destination information corresponding to harvester 102. The destination information can include the location of the destination, an offset and offset direction from harvester 102 which, when reached by material transfer vehicle 106, will place material transfer vehicle 106 at a desired location relative to agricultural harvester 102 so that material transfer vehicle 106 can receive harvested material from agricultural harvester 102. In the example shown in FIG. 8, the destination information is indicated by arrow 160. Once the destination information 160 is generated, then this can be provided to a path planning system 137 which then plans a navigation path 162 for material transfer vehicle 106 to arrive at its destination, accounting for the destination information 160.

It will be noted that, in one example, destination/obstacle processing system 136 can also calculate a direction of approach to the destination, indicating the direction from which the vehicle will approach the destination. The direction of approach can be calculated based on a variety of different criteria, some of which are discussed elsewhere herein.

Figure 9:
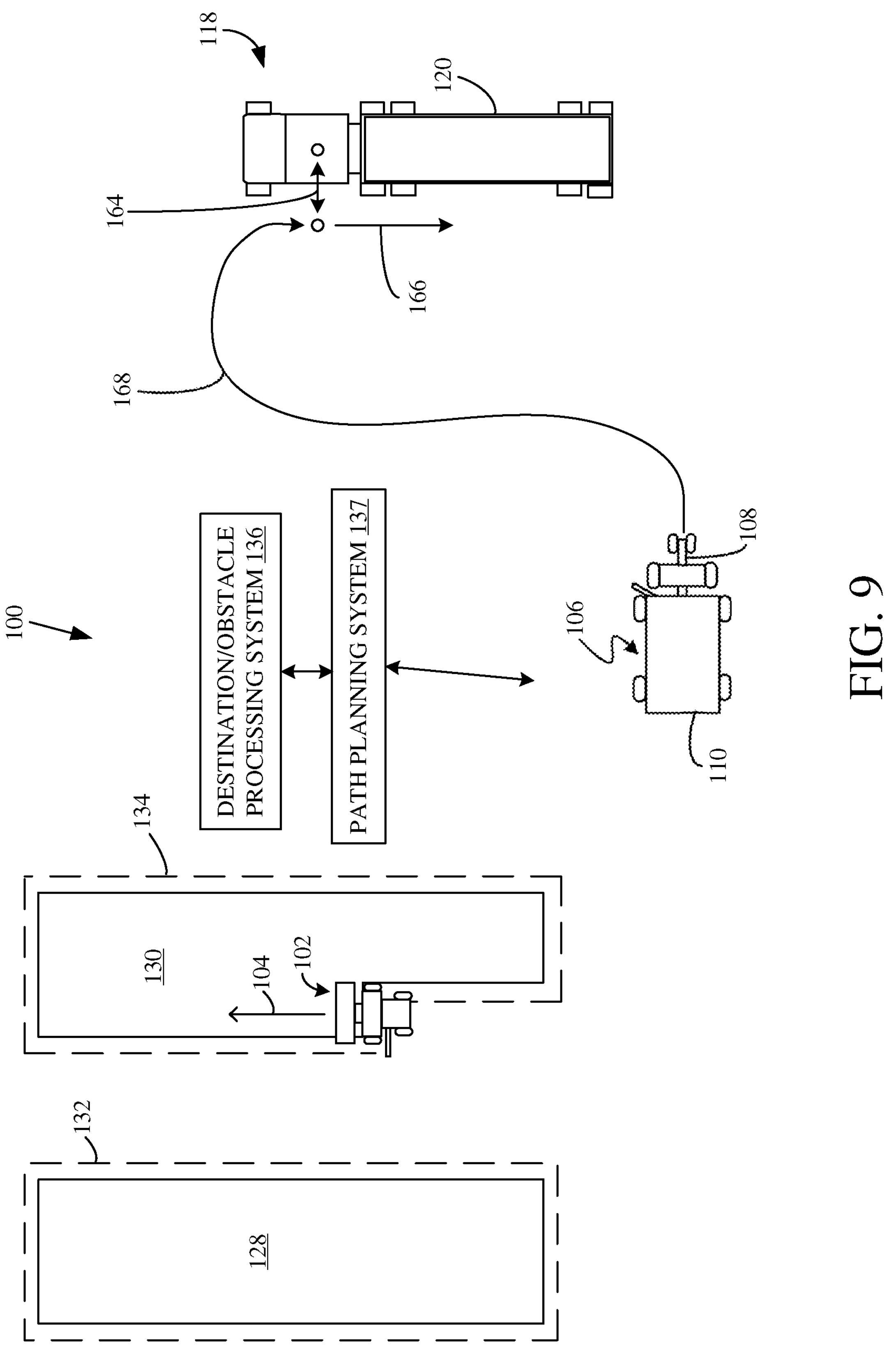

FIG. 9 is similar to FIG. 8, and similar items are similarly numbered. However, in FIG. 9, the destination of material transfer vehicle 106 is semi-trailer 120. As an example, grain cart 110 of material transfer vehicle 106 is filled to a desired level with material from harvester 102, and material transfer vehicle 106 is now proceeding to semi-trailer 120 to unload that material into semi-trailer 120. Therefore, destination/obstacle processing system 136 obtains information corresponding to semi-trailer 120 and material transfer vehicle 106 and calculates a destination location, offset, and offset direction (e.g., destination offset) indicated by arrow 164. Destination offset 164, in the example shown in FIG. 9, represents a lateral offset between material transfer vehicle 106 and semi-trailer 120, that vehicle 106 will maintain as material transfer vehicle 106 proceeds along a path 166 unloading material into semi-trailer 120. Further, based upon the destination offset 164, a path planning system 137 can generate a navigation path 168 that material transfer vehicle 106 can follow in order to arrive at the destination, given the destination offset 164. Again, the destination offset 164 can be calculated based upon a wide variety of different criteria, such as the dimensions and other characteristics of machine transfer vehicle 106 and semi-truck 118, and field characteristics indicative of the terrain proximate semi-truck 118, the type of crop being unloaded, the types of vehicles, etc.

Figure 10:
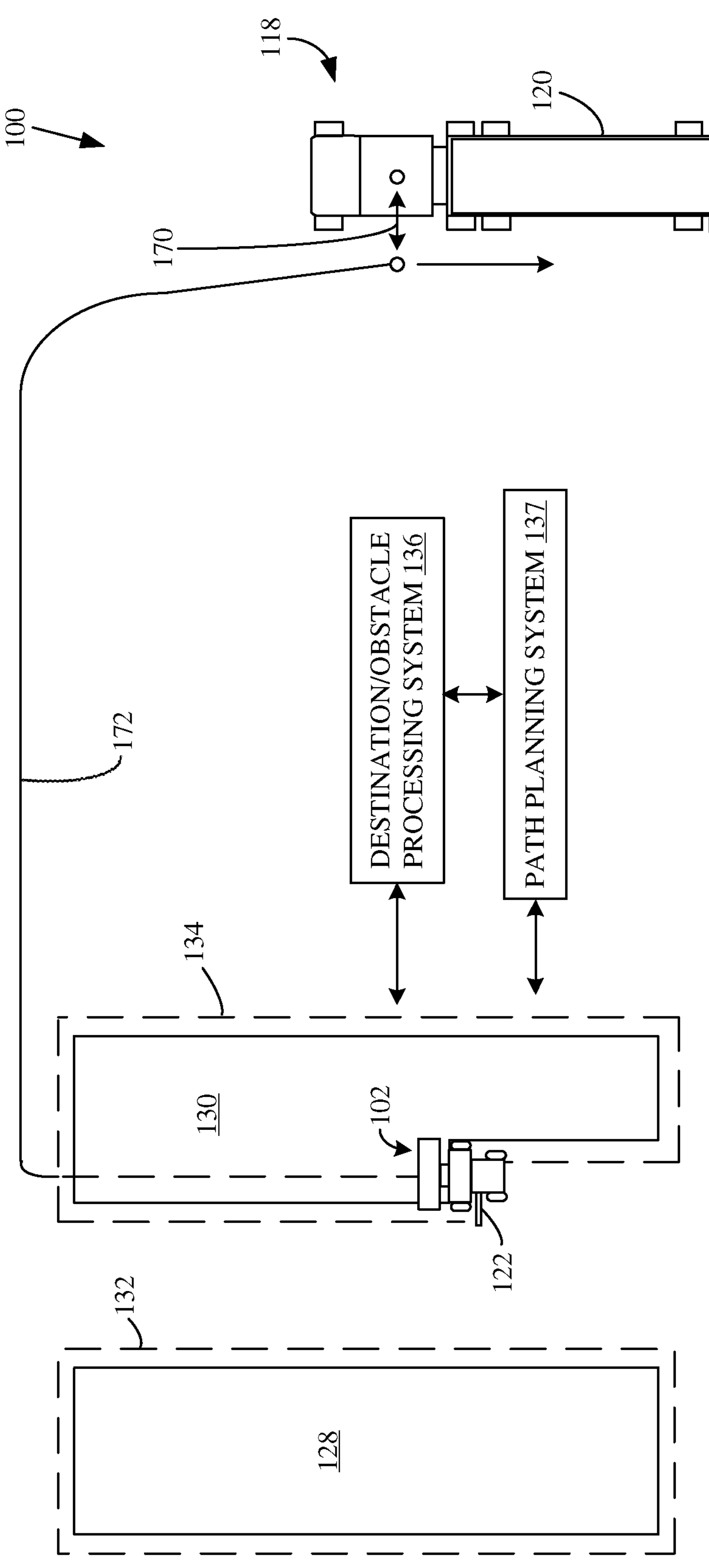

FIG. 10 is a similar to FIG. 9 and similar items are similarly numbered. However, in FIG. 10, there is no material transfer vehicle 106 and, instead, agricultural harvester 102 (once it is filled with harvested material) travels to container 118 to unload the material into semi-trailer 120. Therefore, semi-trailer 120 is the destination of an agricultural harvester 102, and destination/obstacle processing system 136 obtains parameters and information that it uses to generate a destination offset 170. The parameters used by destination/obstacle processing system 136 can include the location of harvester 100 and container 118, the dimensions of harvester 102 and container 118 (including the dimensions of spout 122 and other dimensions), the field characteristics indicative of the terrain around container 118, the load and travel speed of harvester 102, the turning radius and other machine dimensions corresponding to harvester 102, and any of a wide variety of other parameters. Destination/obstacle processing system 136 then calculates the destination offset 170 and provides that information as a path planning constraint to a path planning system 137. The path planning system 137 can then generate a navigation path 172 that agricultural harvester 102 can follow in order to arrive at the destination, given the destination offset 170. The direction of approach can be calculated by system 136 and used as a constraint in system 137 as well.

It can thus be seen that FIGS. 1-10 illustrate examples of the different types of vehicle path planning constraints that can be automatically generated or computed and provided to a path planning system 137 that may use those constraints to generate a navigation path. The navigation path can be generated for the harvester 102, the material transfer vehicle 106, both harvester 102 and material transfer vehicle 106, or other vehicles. The navigation path can be computed to guide navigation of one vehicle, while it accounts for the navigation path and machine dimensions of the other vehicle, particularly where the two vehicles are paired (such as in an unloading operation in which material transfer vehicle 106 is paired with harvester 102 and automatically follows harvester 102).

Figure 11:
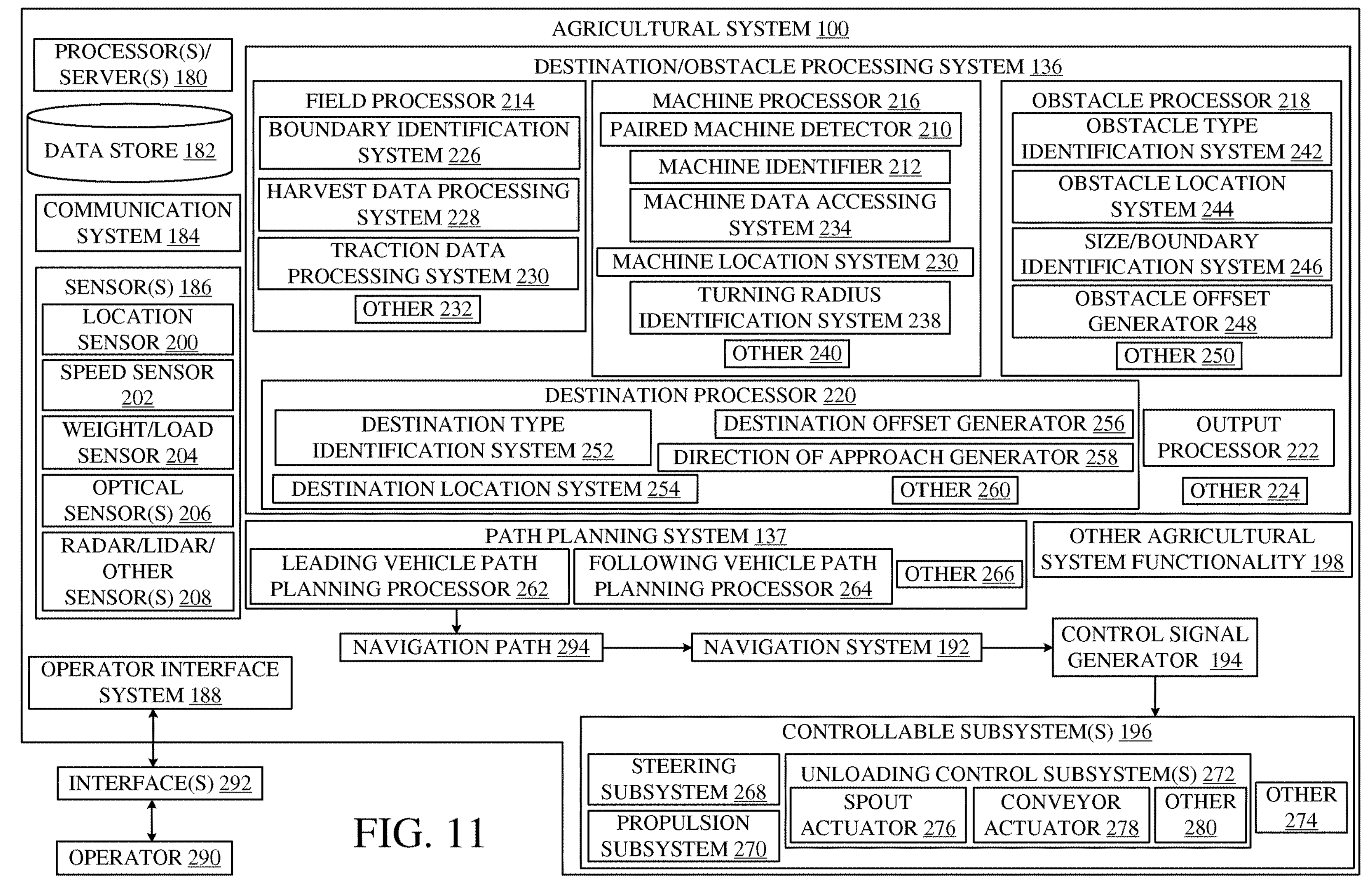
FIG. 11 is a block diagram showing one example of an agricultural system.

FIG. 11 is a block diagram showing some portions of agricultural system 100 and destination/obstacle processing system 136 in more detail. It will again be noted that the different elements of agricultural system 100 shown in FIG. 11 can be deployed on one or more machines, at a remote system (such as in the cloud or in a farm manager system, or elsewhere), or distributed among multiple different locations, such as among multiple different machines, among different machines and a remote server location, etc. The agricultural system 100 and destination/obstacle processing system 136 are described as being in a single location with respect to FIG. 11 for the sake of example only. Also, it will be assumed that the items in agricultural system 100, shown in FIG. 11, are all deployed on a material transfer vehicle 106, for the sake of example. It will be appreciated that the items shown in FIG. 11 can be duplicated on other machines or dispersed among other machines as well. However, for the sake of the present discussion, it will be assumed that the items in FIG. 11 are disposed on the material transfer vehicle 106, unless otherwise indicated. This is for the sake of example only.

In the example shown in FIG. 11, agricultural system 100 includes one or more processors or servers 180, data store 182, communication system 184, one or more sensors 186, operator interface system 188, destination/obstacle processing system 136, path planning system 137, navigation system 192, control signal generator 194, one or more controllable subsystems 196, and other agricultural system functionality 198. Sensors 186 can include one or more location sensors 200, one or more speed sensors 202, one or more weight/load sensors 204, optical sensors 206, and/or RADAR/LIDAR/other sensors 208. Destination/obstacle processing system 136 can include field processor 214, machine processor 216, obstacle processor 218, destination processor 220, output processor 222, and other items 224. Field processor 214 can include boundary identification system 226, harvest data processing system 228, traction data processing system 230, and other items 232. Machine processor 216 can include paired machine detector 210, machine identifier 212, machine data accessing system 234, machine location system 236, turning radius identification system 238, and other items 240. Obstacle processor 218 can include optical type identification system 242, obstacle location system 244, size/boundary identification system 246, obstacle offset generator 248, and other items 250. Destination processor 220 can include destination type identification system 252, destination location system 254, destination offset generator 256, direction of approach generator 258, and other items 260.

Path planning system 137 can include leading vehicle path planning processor 262, following vehicle path planning processor 264, and other items 266. Controllable subsystems 196 can include a steering subsystem 268, propulsion subsystem 270, unloading control subsystems 272, and other items 274. Unloading control subsystems 272 can include spout actuator 276, conveyor actuator 278, and other items 280. Before describing the overall operation of agricultural system 100 in more detail, a description of some of the items in agricultural system 100, shown in FIG. 11, and their operation, will first be provided.

Communication system 184 facilitates communication of the items in agricultural system 100 with one another. Therefore, communication system 184 may be a controller area network (CAN) bus and bus controller, a cellular communication system, a near field communication system, a wide area network communication system or local area network communication system, a Bluetooth or Wi-Fi communication system, or any of a wide variety of other communication systems or combinations of systems. Sensors 146 can sense any of a wide variety of different types of parameters and generate sensor signals indicative of those parameters. Sensors 186 can also include processing functionality, such as signal conditioning functionality (e.g., amplification, linearization, normalization, filtering), image processing, or any of a wide variety of other processing functionality.

Location sensor 200 generates an output indicative of the location of sensor 200 in a local or global coordinate system. Therefore, location sensor 200 may be a global navigation satellite system (GNSS) receiver, a cellular triangulation system, a dead reckoning system (such as including accelerometers, inertial measurement units, etc.), or any of a wide variety of other location sensors. Speed sensor 202 illustratively generates an output indicative of the ground speed of the machine on which speed sensor 202 is mounted. Thus, speed sensor 202 can be a speedometer, a sensor that senses the speed of rotation of a drive shaft, an axle, a wheel, or another type of sensor. Similarly, speed sensor 202 can generate an output indicative of speed based upon inputs from other sensors. By way of example, speed sensor 202 may receive two outputs from location sensor 202 that can be processed to indicate the change in position over time to compute speed. Thus, the speed sensor 202 can generate an output based upon inputs from location sensor 202 and other sensors. Weight/load sensor 204 can sense the weight of a machine and the load in a machine. Therefore, weight/load sensor 204 may be one or more scales, load cells, or other sensors that may be mounted on a machine, in an axle of a machine, or elsewhere, to provide an output indicative of the weight of a machine and/or the load being carried by the machine.

Optical sensors 206 may be one or more mono or stereo cameras or other optical sensors that capture an image and generate an output indicative of the captured image. For instance, an optical sensor 206 may be mounted on material transfer vehicle 106, on agricultural harvester 102, and/or on container 118. The optical sensors 206 may be mounted on unmanned aerial vehicles (UAVs) or elsewhere. The optical sensors may capture an image and generate an output indicative of that image for image processing to identify such things as the type of vehicle in a captured image, the type of destination, the fill level of material in grain cart 110 or semi-trailer 120, characteristics of material being transferred among the different vehicles, terrain characteristics in a field, or other images. RADAR/LIDAR/other sensors 208 may be mounted at one or more different locations in agricultural system 100 and generate an output indicative of items sensed by those sensors. Therefore, RADAR/LIDAR/other sensors 208 may provide an output indicative of the relative position of two vehicles, the relative position of a vehicle and a container, the relative position of a vehicle relative to an obstacle, or other items. Other sensors, such as soil characteristic sensors, crop or machine characteristic sensors, or other sensors can be used as well.

Operator interface system 188 can include operator interface mechanisms that provide outputs to an operator 290 and/or that receive inputs from operator 290. Therefore, operator interface system 188 can include operator interface mechanisms such as a steering wheel, joysticks, pedals, levers, buttons, knobs, display screens or other display elements, speakers and/or microphones, touch sensitive display screens, among other things. When information is displayed on a display screen, the information may include user actuatable input mechanisms, such as icons, buttons, links, drop-down menus, etc., that can be displayed on an interface 292 for interaction by operator 290. The operator 290 can interact with the operator actuatable input mechanisms using a point and click device, using touch gestures, using speech commands, etc. Operator interface system 188 can detect user interaction with operator interface mechanisms and generate outputs on operator interface mechanisms. Operator interface system 188 can be other mechanisms that provide other types of audio, visual, and/or haptic outputs and receive inputs.

Destination/obstacle processing system 136 can receive information about different destinations and obstacles as well as information about the field and machines operating in the field, and generate outputs indicative of vehicle path planning constraints that can be used by path planning system 137 to generate one or more different navigation paths 294 that can be used by navigation system 192. Navigation system 192 can provide an output to control signal generator 194 which generates control signals to control controllable subsystems 196 such as steering subsystem 268 and propulsion subsystem 270 to navigate the vehicle along the navigation path 294.

Field processor 214 obtains field characteristics and generates outputs indicative of vehicle path planning constraints based upon the field characteristics. Boundary identification system 226 identifies the field boundary which may be from a map stored in data store 182, from an operator input, or elsewhere. Harvest data processing system 228 identifies harvest data, such as the crop being harvested, coverage data indicative of where crop has already been harvested, and other data, such as crop moisture, other crop characteristic, different field positions (e.g., lands) to be harvested, harvest patterns, etc. Traction data processing system 230 can obtain an indication of areas where different traction conditions exist, such as where the field is rocky or muddy, etc. Traction data processing system 230 can receive an input from a transmission, a traction control system, or slip detection system, an input from soil moisture detector or other sensor that provides a signal indicative of traction. Other field characteristics can include elevation, slope, soil type, among other information.

Machine processor 216 receives and processes machine data to generate path planning constraints related to one or more vehicles. Therefore, paired vehicle detector 210 can detect when a vehicle is paired with another vehicle. For instance, when agricultural harvester 102 is paired with a material transfer vehicle 106 so that material transfer vehicle 106 is automatically controlled to stay within a predefined relationship with respect to agricultural harvester 102, then paired machined detector 210 detects that the two vehicles are paired with one another. In another example, paired machine detector 210 can receive sensor signals to detect that a material transfer vehicle 106 is in an unloading position relative to an agricultural harvester 102 to determine that the two vehicles are paired. Paired machine detector 210 may thus receive an input from an optical sensor 206 or from a communication system 184 indicating that the two vehicles are in a desired spatial relationship relative to one another or are communicating with one another to maintain that spatial relationship. Paired machine detector 210 may receive an input from other sensors or other systems to indicate that the machines are paired together.

Machine identifier 212 identifies machines in agricultural system 100. For instance, machine identifier 212 may process an image captured by optical sensor 206 that contains a machine and identify that machine based upon the image. Machine identifier 212 may receive a communication over communication system 184 from another machine identifying the other machine. Machine identifier 212 may receive an input from operator 290 identifying the machine as well. Machine identifier 212 may identify the machine by identifying the type of machine (such as make and model number of the machine) or by identifying the specific machine itself. Thus, machine identifier 212 may identify agricultural harvester 102, the tractor 108 and grain cart 110 in material transfer vehicle 106, the machines comprising container 118, and/or other machines.

Machine data accessing system 234 can then access machine data corresponding to the identified machines. The machine data accessing system 234 may access the machine data from data store 182, from a remote server system, or elsewhere. The machine data may include such things as machine dimensions, machine specifications, machine load, speed, etc. Machine location system 230 identifies the location of the identified machine based on a signal from location sensor 200 or based on other information. Turning radius identification system 238 calculates or computes the turning radius of the machine based upon the machine data (including the type of machine, the dimensions of the machine, the load and/or weight of the machine, vehicle speed at different portions of a path where a turn is to be executed, as well as other machine information) and can consider other information, such as field characteristics, as well.

Obstacle processor 218 detects or obtains information about obstacles and generates obstacle-related information that can be output as path planning constraints. The obstacle-related information can include an obstacle location and an offset corresponding to each obstacle in the field. Obstacle type identification system 242 identifies the type of obstacle. The type of obstacle may be identified based upon image data, operator inputs, other sensor or map inputs, or other information. For example, the type of obstacle may be obtained from a map (which may map waterways, drain tiles, or other information in a field). The obstacle type identification system 242 may identify the obstacle type as a rock, a pole, a water area, a drain, trees, a fence line, or any of a wide variety of other obstacle types.

Obstacle location system 244 identifies the location of the obstacle. The location may be obtained from mapping data where the location of the obstacle has already been mapped. The location of the obstacle can also be obtained from image data where an image of the obstacle is captured and a position of the image capture device relative to the obstacle is known or detected. The obstacle location system 244 can detect the obstacle location using an image capture device (e.g. one or more cameras), infrared sensors, ultrasonic sensors, sensors on unmanned aerial vehicles, RADAR or LIDAR sensors, or in other ways as well.

Size/boundary identification system 246 identifies the size and/or boundary location of the obstacle. The size or boundary can be detected or provided through an operator input. The size or boundary can be identified from a map or from a sensor input or from other location data as well. Based upon the obstacle information, obstacle offset generator 248 generates an offset corresponding to each identified obstacle. The offset may be based on the obstacle type, the size or boundary of the obstacle, the obstacle location, among other things. The obstacle information (e.g., the obstacle location and obstacle offset) can be output as vehicle path planning constraints to path planning system 137.

Destination processor 220 obtains information about the destination of the vehicle (e.g., in the example being discussed the destination of material transfer vehicle 106) and generates vehicle path planning constraints corresponding to the destination. The path planning constraints can be, for instance, the destination location, the destination offset, the offset direction, the direction of approach corresponding to the destination, among other things. Therefore, destination type identification system 252 identifies the destination type. The destination type may be a container type, a vehicle type (such as an agricultural harvester), or another destination type. The destination type can be identified based on an operator input through operator interface system 188, based on receiving a signal from a destination vehicle over communication system 184 indicating the type of destination vehicle, by processing an image or other sensor signal corresponding to the destination, or in other ways. Destination location system 254 identifies the location of the destination. The location of the destination may be transmitted by a destination vehicle (e.g., by agricultural harvester 102 or container 118 may send their destinations to material transfer vehicle 106) or by processing other sensor signals corresponding to the destination. The destination offset generator 256 may obtain information corresponding to material transfer vehicle 106 (such as the machine dimensions, the length and dimensions of the spout used to unload material from grain cart 110, etc.), as well as information corresponding to the destination (such as the destination dimensions, among other things). The destination offset generator 256 then computes an offset (e.g., a lateral distance and front-to-back distance-where desired), that indicates where the material transfer vehicle should reside relative to the destination as well as the direction of that offset relative to the destination. For instance, as discussed above with respect to FIG. 10, the destination offset 170 can be computed relative to container 118. In the example discussed above with respect to FIGS. 8 and 9, the destination offset 164 can also be computed with respect to container 118, or destination offset 160 can be computed relative to agricultural harvester 102.

Direction of approach generator 258 can obtain information corresponding to material transfer vehicle 106 and the destination, as well as field information, and/or other information and generate a direction of approach from which material transfer vehicle 106 should approach the destination. By way of example, if material transfer vehicle 106 has, as a destination, agricultural vehicle 102 (as shown in FIG. 8), then direction of approach generator 258 can identify the location and direction of travel of agricultural harvester 102, as well as the coverage data indicating where crop has already been harvested, and configuration data indicating the direction that spout 122 extends from agricultural harvester 102 and compute the direction from which material transfer vehicle 106 should approach agricultural harvester 102. Similarly, where material transfer vehicle 106 has, as a destination, container 118, then direction of approach generator 258 can detect the side of grain cart 110 from which its spout 110 extends, as well as the desired fill pattern (e.g., front-to-back, back-to-front, etc.) for the container 118, as well as field characteristics in the area around container 118 (such as whether the ground on one side or other of container 118 is muddy, rocky, sloped or otherwise unsuitable for approach by material transfer vehicle 106). Based upon that information, direction of approach generator 258 generates as a vehicle path planning constraint the direction of approach from which material transfer vehicle 106 should approach its destination.

Output processor 222 can aggregate the path planning constraints and output the path planning constraints together or output the path planning constraints as they are available or in other ways. All of the vehicle path planning constraints output by output processor 222 can be provided to path planning system 137. Path planning system 137 can then generate a navigation path 294 for material transfer vehicle 106 and/or for agricultural harvester 102 (accounting for the travel path of material transfer vehicle 106) or for both vehicles separately.

Path planning system 137 may be a local or a global path planning system. Path planning system 137 can implement any of a wide variety of different algorithms such as the Dijkstra algorithm, an A-Star algorithm, a D-Star algorithm, and/or any of a wide variety of other path planning algorithms.

Leading vehicle path planning processor 262 can generate a navigation path 294 for a leading vehicle in a paired set of vehicles (such as for agricultural harvester 102 when paired with material transfer vehicle 106). When leading vehicle path planning processor 262 generates the navigation path 294 for the leading vehicle, then leading vehicle path planning processor 262 includes, as constraints on that navigation path 294, the constraints output by destination/obstacle processing system 136. Therefore, the leading vehicle path planning system processor 262 generates the navigation path 294 for agricultural harvester 102, accounting for the navigation path of material transfer vehicle 106, and therefore constraining the path 294 of agricultural harvester 102 to a path where material transfer vehicle 106 can follow agricultural harvester 102 in a desired spatial relationship without violating any of the vehicle path planning constraints (e.g., without impinging on an obstacle offset, a destination offset, etc.). Following vehicle path planning processor 264 may also, or instead, generate a navigation path 294 for the following vehicle (e.g., for material transfer vehicle 106). The navigation path for material transfer vehicle 106 will also account for the vehicle path planning constraints output by destination/obstacle processing system 136.

Based upon the one or more navigation paths 294, navigation system 192 generates an output to control signal generator 194 so that control signal generator 194 can control the controllable subsystems 196 to navigate the material transfer vehicle 106 along the desired navigation path. Thus, navigation system 192 can provide an output to control signal generator 194 so that control signal generator 194 can generate control signals to control the steering subsystem 268 of propulsion vehicle 108 and/or the propulsion subsystem 270 of propulsion vehicle 108 to navigate material transfer vehicle 106 along the desired navigation path. Navigation system 192 can thus include deterministic, non-deterministic, or other types of algorithms. Such systems can incorporate path guidance or other guidance systems as well.

Steering subsystem 268 can include a steering wheel, joysticks, skid steer steering mechanisms or other mechanisms that can be used to steer propulsion vehicle 108. Propulsion subsystem 270 can include an internal combustion engine, electric motors, hydraulic motors, a transmission or direct drive system, or other mechanisms that provide propulsion to propulsion vehicle 108. Spout actuator 276 can be controlled to actuate the spout 112 on grain cart 110 to move the spout from a retracted position to a deployed position and to also change the position of spout 112 to change the landing point of material that is being unloaded from grain cart 110 into semi-trailer 120. Spout actuator 276 can be a hydraulic actuator, an electric actuator, a pneumatic actuator, or any of a wide variety of other types of actuators. Conveyor actuator 278 can be used to control the conveyor in spout 112 (e.g., to turn on and off an auger, to control the auger speed, etc.). Conveyor actuator 278 may be a power take-off or another type of actuator that receives power from propulsion vehicle 108.

Figure 12:
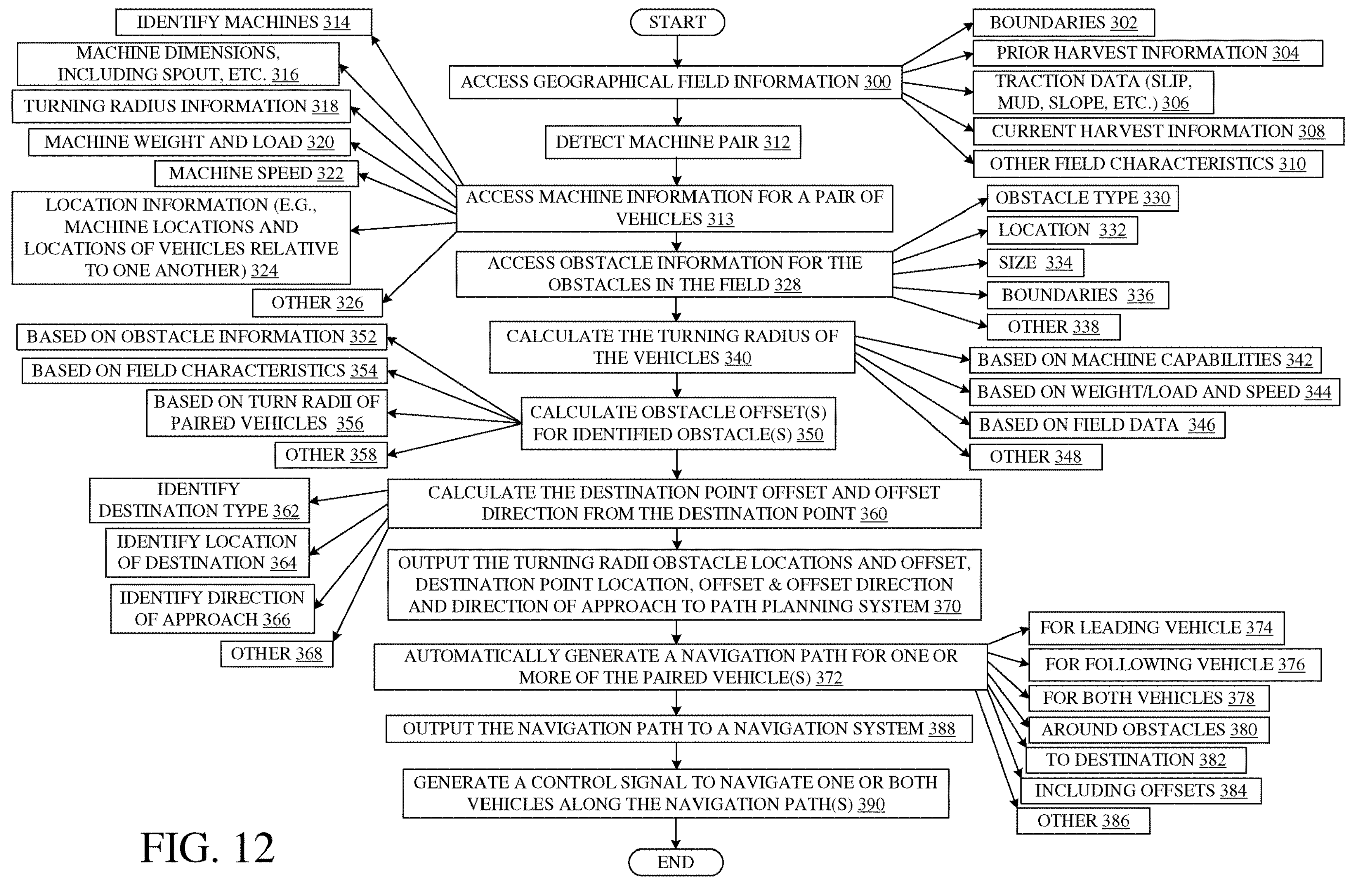
FIG. 12 is a flow diagram illustrating one example of the operation of the agricultural system illustrated in previous figures.

FIG. 12 is a flow diagram illustrating one example of the operation of agricultural system 100. Again, for purposes of the present description, it will be assumed that destination/obstacle processing system 136 and other items in FIG. 11 are mounted on the propulsion vehicle 108 of material transfer vehicle 106. This, of course, is for the sake of example only and the items could be on another vehicle, distributed on other vehicles, in remote locations, or elsewhere.

Field processor 214 first obtains geographical field information, as indicated by block 300 in the flow diagram of FIG. 12. Boundary identification system 226 can obtain the field boundaries 302. Harvest data processing system 228 can obtain prior harvest information 304 (which may include the location of obstacles, coverage data indicating where crop has been harvested, and/or any of a wide variety of other harvest data). Traction data processing system 230 can obtain traction data 306 (which may include data from a slip processor or traction control system, locations of mud, terrain slope, soil texture, among other things). Other geographical field information can include current harvest information 308 from other harvesters, which may identify where the field has already been harvested by a current harvester or plurality of different harvesters, the lands or other field sections that are to be harvested, among other things. Field processor 214 can obtain other field characteristics or field information as well, as indicated by block 310 in the flow diagram of FIG. 12.

Machine processor 216 then obtains and processes machine data. Paired machine detector 210 can detect whether material transfer vehicle 106 is paired with another machine, such as with an agricultural harvester 102. Detecting a machine pair is indicated by block 312 in the flow diagram of FIG. 12. Machine data accessing system 234 can then detect or access other machine data. For instance, machine identifier 212 can identify agricultural harvester 102, material transfer vehicle 106, container 118, or other machines, as indicated by block 314. Machine data accessing system 234 can then access machine data corresponding to the identified machines, such as machine dimensions, machine specifications, and other machine information, as indicated by block 316 in the flow diagram of FIG. 12. The machine data may, for example, be downloaded from a remote server, stored and indexed in data store 182 by machine identity, input by an operator or obtained in other ways. Turing radius identification system 238 can identify and process turning radius information, as indicated by block 318. The turning radius information May be in machine specifications for the identified machines, or the turning radius information may be computed or calculated based upon the machine dimensions, power specifications, and other configuration data identifying the configuration of the identified machines. Turning radius identification system 238 can also identify such things as the machine weight and load as indicated by block 320 and machine speed as indicated by block 322. Such information can be obtained, for example, by speed sensor 202 and weight/load sensor 204 or in other ways. Machine location system 230 also identifies the location of material transfer vehicle 106 and can also identify the location of other machines 102 and container 118, as well as identify the location of the vehicles relative to one another. Identifying the location information is indicated by block 324 in the flow diagram of FIG. 12. The machine processor 216 can obtain and compute or process any of a wide variety of other machine information as well, as indicated by block 326 in the flow diagram of FIG. 12.

Obstacle processor 218 can then access and compute obstacle information for the obstacles in the field, as indicated by block 328 in the flow diagram of FIG. 12. Obstacle type identification system 242 can access or identify obstacle type 330. Obstacle location system 244 can access or identify obstacle location 332. Size/boundary identification system 246 can obtain or identify the obstacle size 334 and the obstacle boundaries 336. Other obstacle information 338 can be obtained and processed as well. The obstacle information can be pre-mapped, detected by other machines during prior operations in the field or during a prior pass while conducting a current operation, detected during runtime, or obtained in other ways.

When information is obtained that can be used to compute or estimate the turning radius capability of the vehicles, turning radius identification system 238 computes or generates the turning radius of the vehicles involved, such as the material transfer vehicle 106, agricultural harvester 102, etc. Calculating the turning radius of the vehicles is indicated by block 340 in the flow diagram of FIG. 12. The turning radius can be based upon the machine capabilities (such as based on a specified turning radius or other machine capabilities), as indicated by block 342. The turning radius can be modified or otherwise generated based upon the weight, load, and/or speed of the machine (either detected or predicted) at different points in the field, as indicated by block 344. The turning radius may be location-specific or generated based on field data 346, such as terrain data (e.g. whether the field is muddy, rocky, sloped, etc.) The turning radius for the vehicles can be computed or generated in a wide variety of other ways, using other parameters as well, as indicated by block 348. Obstacle offset generator 248 calculates the obstacle offsets for each of the identified obstacles in the field, as indicated by block 350. The obstacle offset can be calculated based upon the obstacle information (such as obstacle location, obstacle type, obstacle size and boundary information, etc.), as indicated by block 352 in the flow diagram of FIG. 12. The obstacle offset can be generated based on field characteristics in the region proximate the obstacle, as indicated by block 354, such as whether the field is muddy or slippery, the field boundaries, or other field characteristics. The obstacle offsets can be calculated based upon the turning radius of each of the vehicles that may encounter the obstacles or the estimated speed of those vehicles or the configuration of those vehicles in the area proximate the obstacles, as indicated by block 356 in the flow diagram of FIG. 12. The obstacle offsets can be calculated in any of a wide variety of other ways as well, as indicated by block 358.

Destination processor 220 then receives, detects, or accesses destination information and calculates or detects the destination location, destination type, direction of approach, offset, and offset direction as indicated by block 360 in the flow diagram of FIG. 12. Destination type identification system 252 identifies the destination type, as indicated by block 362. Destination location system 254 identifies the destination location 364, and direction of approach generator 258 identifies the direction of approach, as indicated by block 366. The direction of the offset from the destination may be based upon the identified direction of approach or in other ways. Destination processor 220 can detect, obtain, or generate other information as well, as indicated by block 368 in the flow diagram of FIG. 12.

Output processor 222 then generates an output indicative of all the vehicle path planning constraints generated or obtained from destination/obstacle processing system 136. For instance, output processor 222 can output the turning radii of the various vehicles, the obstacle locations and offsets, the destination point locations, offsets and offset directions, as well as the direction of approach, to the path planning system 137, as indicated by block 370 in the flow diagram of FIG. 12. Of course, a wide variety of other vehicle path planning constraints can be output as well.

Path planning system 137 then generates a navigation path 294 for one or more of the paired vehicles, as indicated by block 372 in the flow diagram of FIG. 12, accounting for the vehicle path planning constraints for both vehicles. Leading vehicle path planning processor 262 can generate a navigation path 294 for the leading vehicle (e.g., agricultural harvester 102) accounting for the vehicle path planning constraints, as indicated by block 374 in the flow diagram of FIG. 12. For instance, the navigation path 294 for agricultural harvester 102 can be generated assuming that material transfer vehicle 106 will be traveling along with agricultural harvester 102 through the field. Following vehicle path planning processor 264 can generate a navigation path 294 for the following vehicle (e.g., material transfer vehicle 106) accounting for the vehicle path planning constraints, as indicated by block 376. Path planning system 137 can generate a navigation path 294 for both vehicles in the set of paired vehicles, as indicated by block 378. The navigation paths will navigate the vehicles around the obstacles and corresponding offsets, as indicated by block 380 and to the desired destination, as indicated by block 382, as well as account for the various obstacle offsets, destination offsets, and directions of approach, etc., as indicated by block 384. The path planning system 137 can generate a navigation path in other ways as well, as indicated by block 386.

Path planning system 137 outputs the navigation path 294 to navigation system 192, as indicated by block 388 in the flow diagram of FIG. 12. Navigation system 192 generates an output to control signal generator 194 to generate control signals to navigate one or both vehicles along the navigation path(s), as indicated by block 390.

It can thus be seen that the present description describes a system that automatically computes vehicle path planning constraints for a path planning system. The vehicle path planning constraints can be for a plurality of different vehicles in a paired vehicle scenario and the path planning system generates a navigation path to account for the vehicle path planning constraints of both vehicles. Thus, the present system greatly improves the accuracy with which navigation paths can be planned to perform an agricultural operation. Similarly, the present description greatly improves the number of scenarios in which a drivable path can be automatically generated.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The US displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted that the data stores can each be broken into multiple data stores. All can be local to the systems accessing the data stores, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, sensors, and/or logic. It will be appreciated that such systems, components, generators, sensors, and/or logic can be comprised of hardware items (such as processors and associated memory, or other processing components, some of which are described below) that perform the functions associated with those systems, components, generators, sensors, and/or logic. In addition, the systems, components, generators, sensors, and/or logic can be comprised of software that is loaded into a memory and is subsequently executed by a processor or server, or other computing component, as described below. The systems, components, generators, sensors, and/or logic can also be comprised of different combinations of hardware, software, firmware, etc., some examples of which are described below. These are only some examples of different structures that can be used to form the systems, components, generators, sensors, and/or logic described above. Other structures can be used as well.

Figure 13:
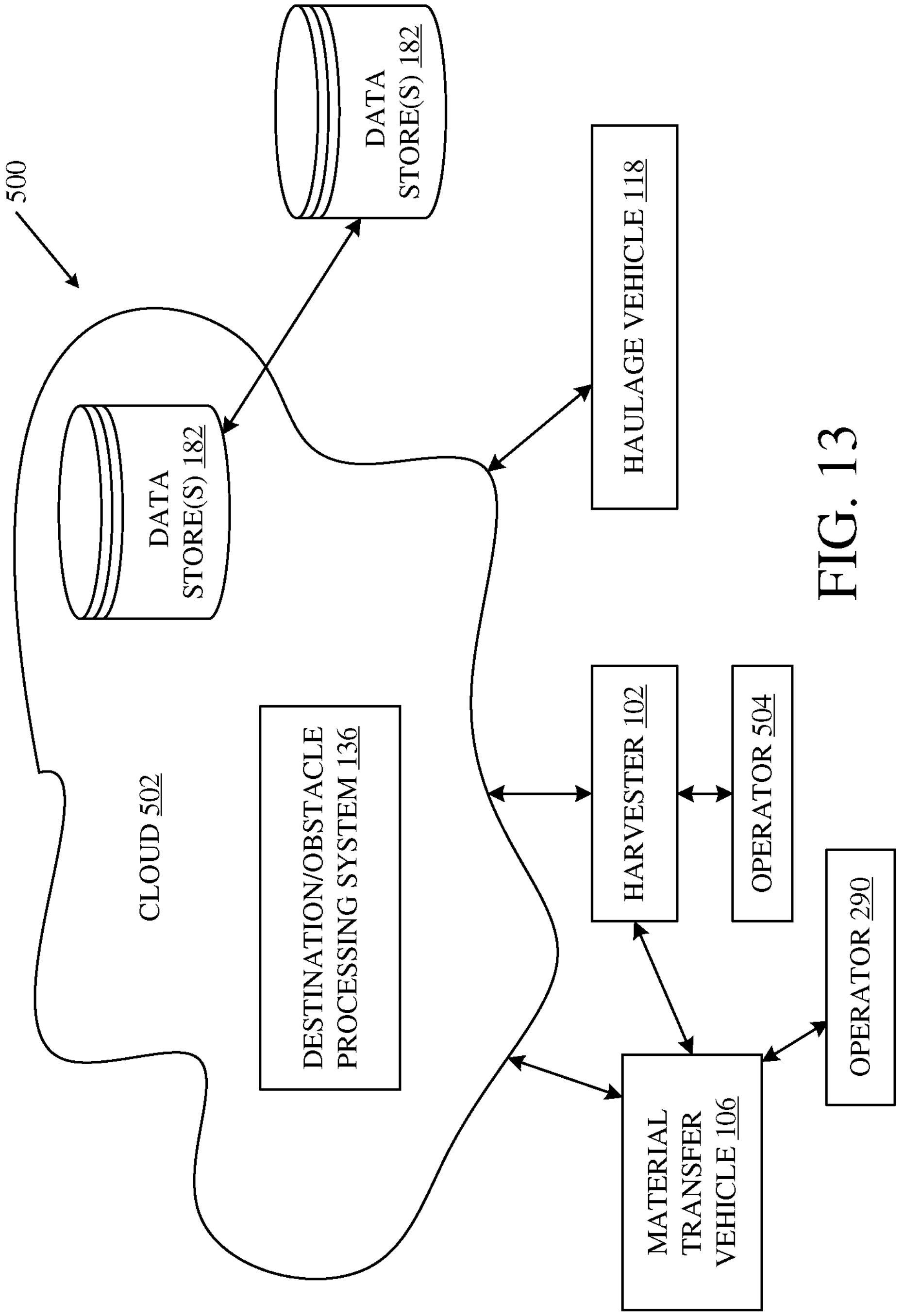
FIG. 13 is a block diagram of an agricultural system deployed in a remote server environment.

FIG. 13 is a block diagram of agricultural system 100, shown in FIG. 1, with harvester 102 having operator 504, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 13, some items are similar to those shown in previous FIGS. and they are similarly numbered. FIG. 13 specifically shows that destination/obstacle processing system 136, and/or data store 182 can be located at a remote server location 502. Therefore, system 100 accesses those systems through remote server location 502.

FIG. 13 also depicts another example of a remote server architecture. FIG. 13 shows that it is also contemplated that some elements of previous FIGS are disposed at remote server location 502 while others are not. By way of example, data store 182 or destination/obstacle processing system 136 can be disposed at a location separate from location 502, and accessed through the remote server at location 502. Regardless of where the items are located, the items can be accessed directly by vehicles in system 100, through a network (either a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester or material transfer vehicle comes close to the fuel truck for fueling, the system automatically sends the information from the fuel truck using any type of ad-hoc wireless connection. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
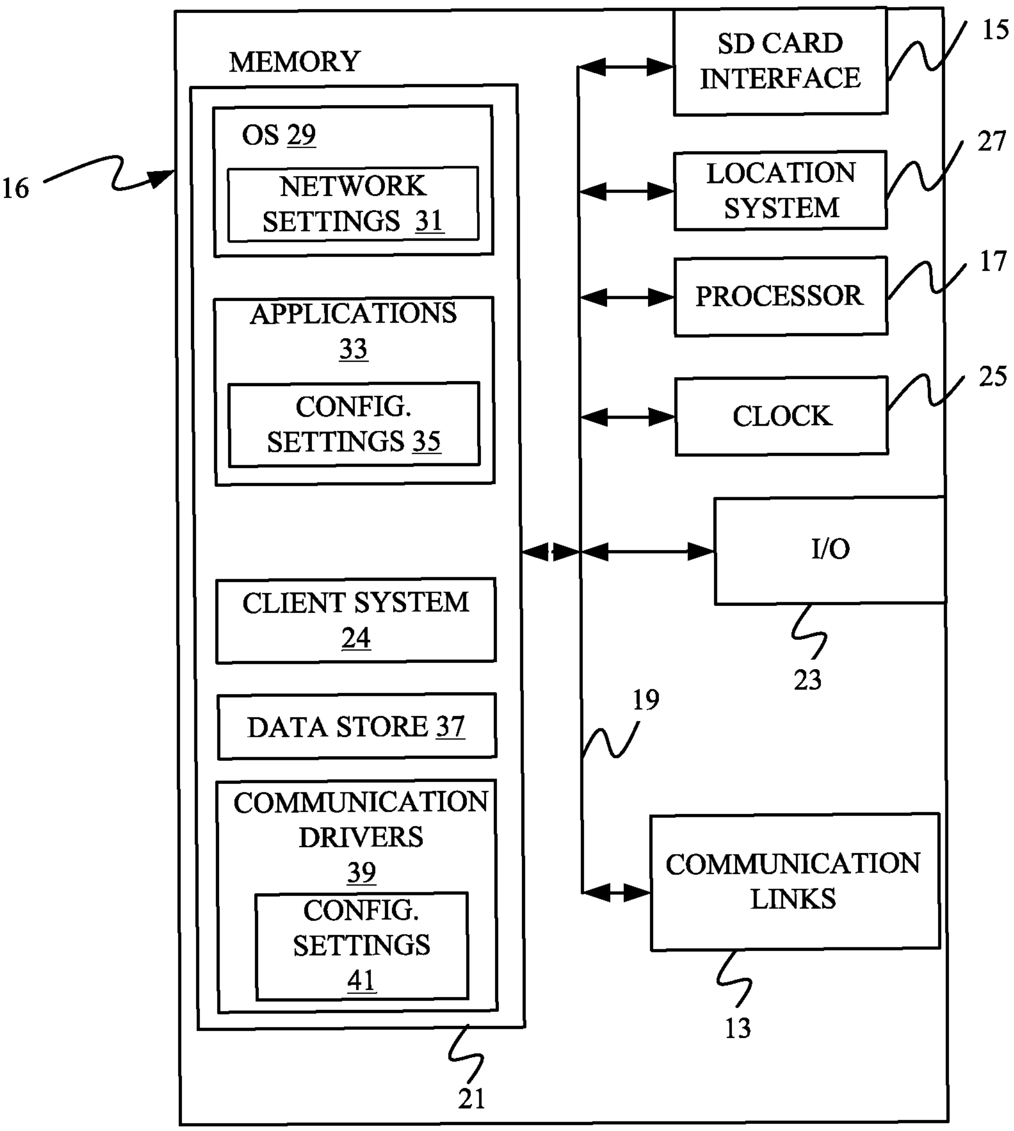
FIGS. 14, 15, and 16 show examples of mobile devices that can be used in the systems and architectures in other figures.
Figure 15:
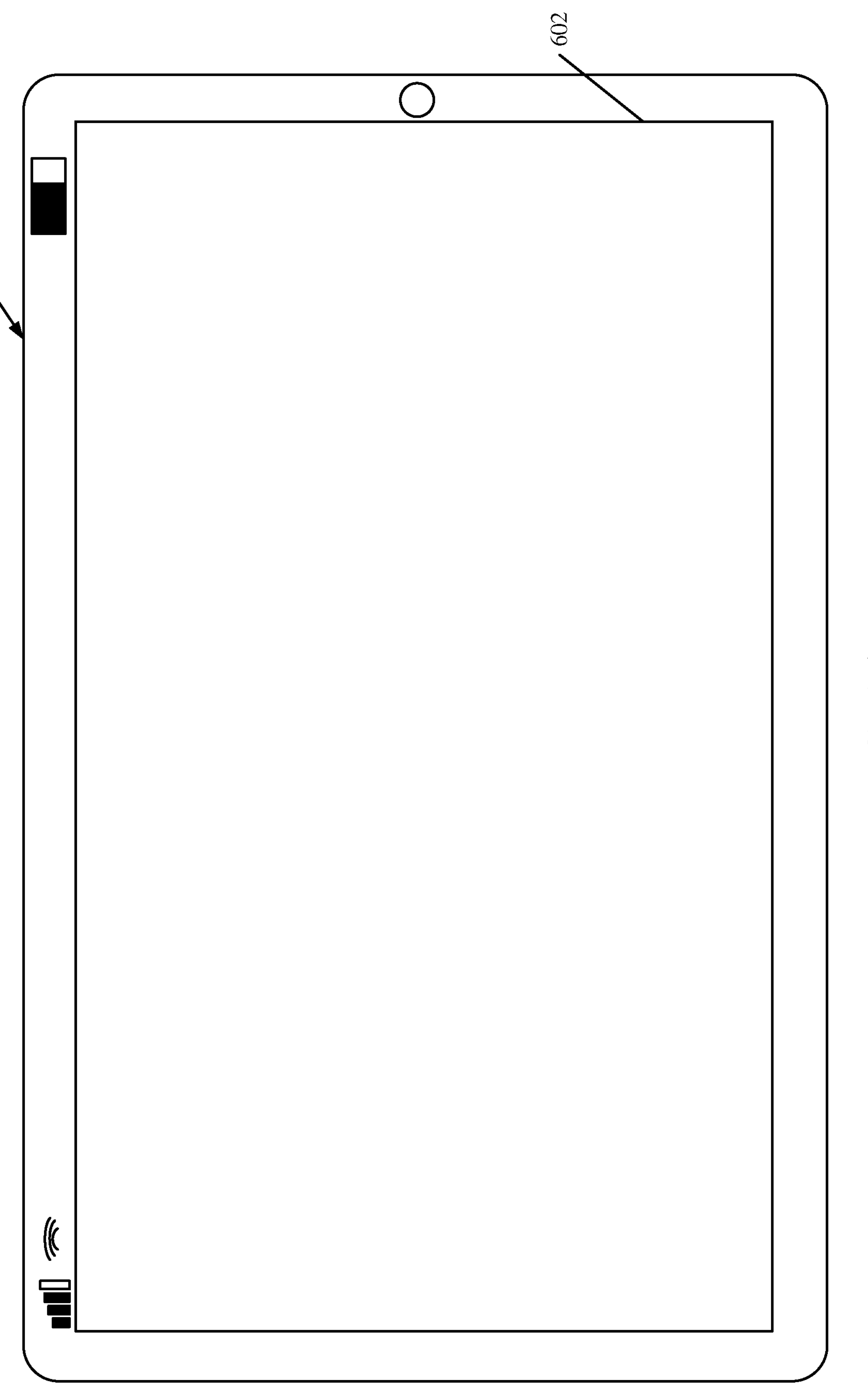
Figure 16:
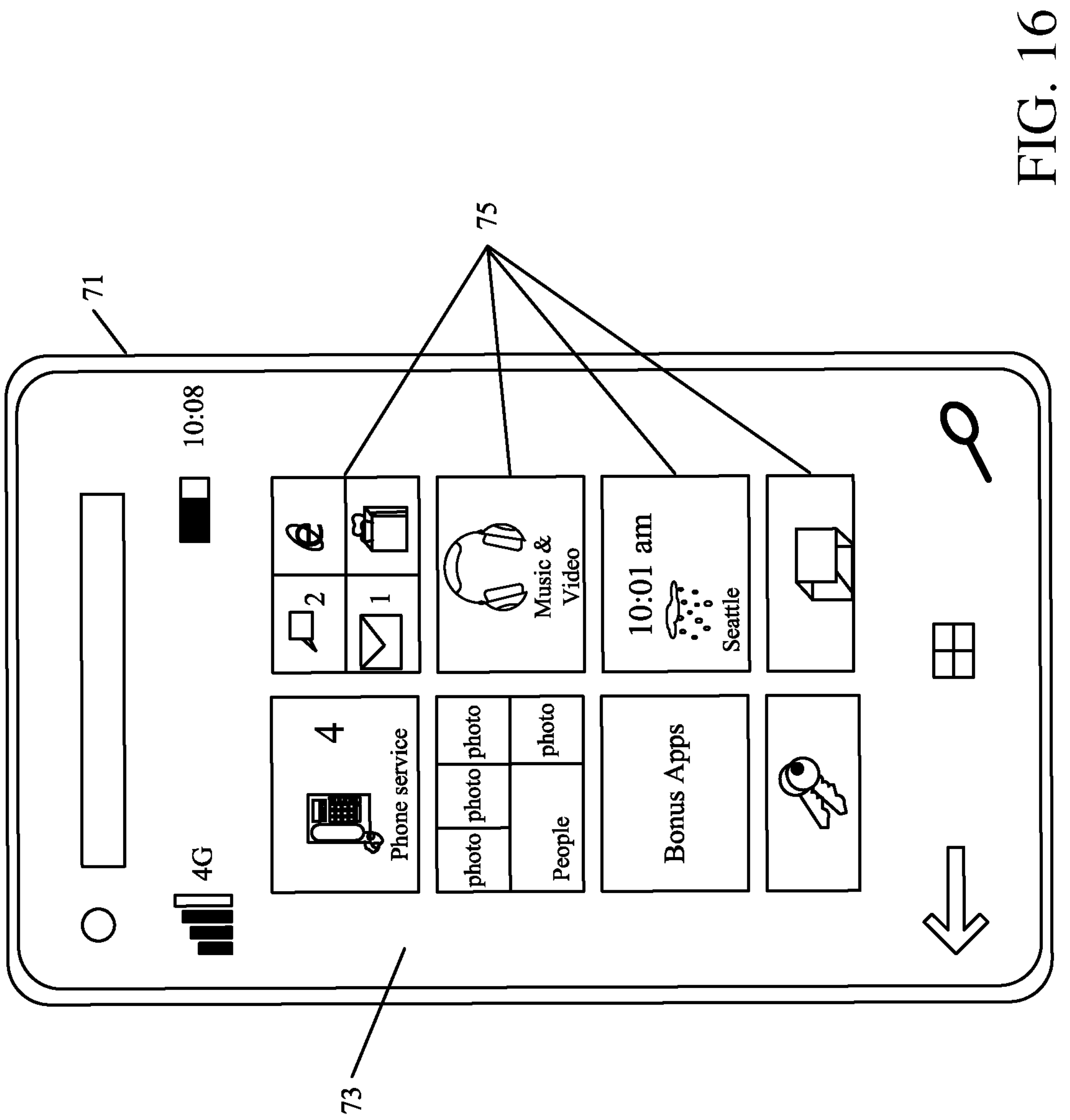

FIG. 14 is a simplified block diagram of one illustrative example of a handheld or mobile computing device that can be used as a user's or client's handheld device 16, in which the present system (or parts of it) can be deployed. For instance, a mobile device can be deployed in the operator compartment of harvester 102 or propulsion vehicle 108 for use in generating, processing, or displaying the navigation path offsets, etc. FIGS. 15-16 are examples of handheld or mobile devices.

FIG. 14 provides a general block diagram of the components of a client device 16 that can run some components shown in previous FIGS., that interacts with the components, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17. Location system 27 illustratively includes a component that outputs a current geographical location of device 16. This component can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 600. In FIG. 715 computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
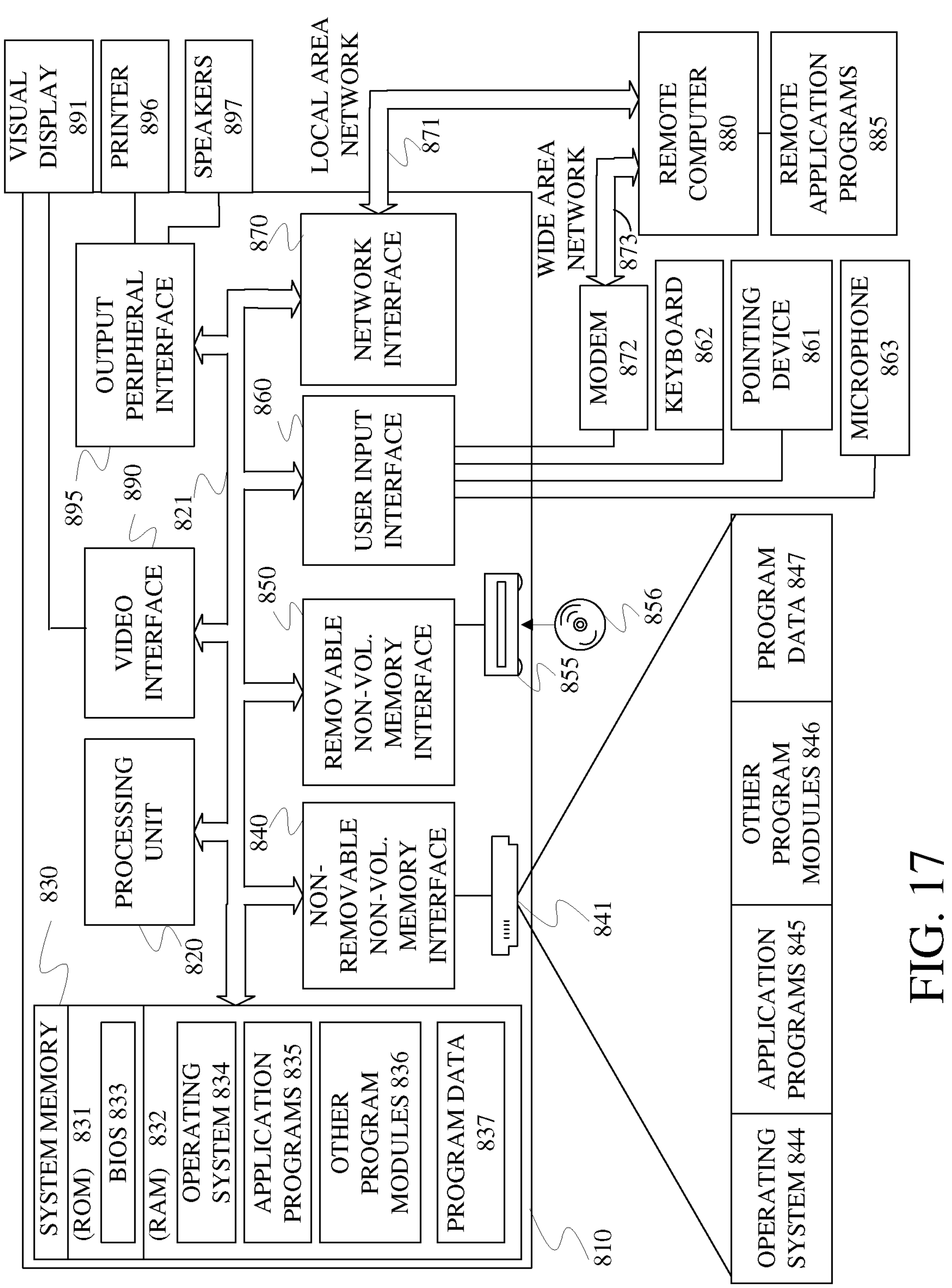
FIG. 17 is a block diagram of one example of a computing environment that can be used in the systems and architectures shown in other figures.

FIG. 17 is one example of a computing environment in which elements of previous FIGS., or parts of it, (for example) can be deployed. With reference to FIG. 17, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media May embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

navigating a first agricultural vehicle along a navigation path through a field;

automatically controlling a second agricultural vehicle to stay within a spatial relationship of the first agricultural vehicle;

identifying an obstacle characteristic of an obstacle in the field;

identifying a turning radius corresponding to the second agricultural vehicle;

modifying the navigation path of the first agricultural vehicle based on the obstacle characteristic and the turning radius, to obtain a modified navigation path, so that the first agricultural vehicle and the second agricultural vehicle avoid the obstacle as the first agricultural vehicle follows the modified navigation path and as the second agricultural vehicle stays within the first spatial relationship of the first agricultural vehicle; and controlling the first agricultural vehicle to follow the modified navigation path.

2. The computer implemented method of claim 1, wherein modifying the navigation path comprises:

computing an obstacle offset corresponding to the obstacle based on the obstacle characteristic, the obstacle offset defining a boundary around at least a portion of the obstacle; and modifying the navigation path based on the obstacle offset.

3. The computer implemented method of claim 1, wherein identifying the turning radius comprises:

accessing machine information corresponding to the second agricultural vehicle and indicating capabilities of the second agricultural vehicle; and computing the turning radius corresponding toof the second agricultural vehicle based on the capabilities of the second agricultural vehicle.

4. The computer implemented method of claim 3, wherein computing the turning radius comprises:

obtaining an indication of a weight of the second agricultural vehicle;

identifying an indication of a speed of the second agricultural vehicle in an area proximate the obstacle; and computing the turning radius corresponding toof the second agricultural vehicle based on the weight and the speed of the second agricultural vehicle.

5. The computer implemented method of claim 1 and further comprising:

identifying a destination characteristic of a destination of the second agricultural vehicle; and generating a second navigation path for the second agricultural vehicle based on the destination characteristic.

6. The computer implemented method of claim 5, wherein identifying a destination characteristic comprises:

identifying a destination location indicative of a location of the destination.

7. The computer implemented method of claim 1, wherein identifying the turning radius comprises:

obtaining an indication of terrain in an area proximate the obstacle; and computing the turning radius corresponding to the second agricultural vehicle based on the terrain proximate the obstacle.

8. The computer implemented method of claim 1, wherein the first agricultural vehicle comprises a harvester and the second agricultural vehicle comprises a material transfer vehicle, and wherein modifying the navigation path comprises:

modifying the navigation path to harvest material in an area proximate the obstacle to generate a clearance area, the clearance area being configured to facilitate the material transfer vehicle passing through the clearance area, maintaining the spatial relationship as the harvester passes the obstacle.

9. The computer implemented method of claim 1, wherein the obstacle comprises an area of the field and wherein identifying the obstacle characteristic comprises:

identifying a terrain characteristic indicative of terrain in the area of the field.

10. A computer implemented method, comprising:

navigating a first agricultural vehicle along a navigation path through a field;

automatically controlling a second agricultural vehicle to stay within a spatial relationship of the first agricultural vehicle;

identifying an obstacle characteristic of an obstacle in the field;

identifying a turning radius corresponding to the second agricultural vehicle;

generating a first path planning constraint based on the identified obstacle characteristic and the turning radius; and modifying the navigation path off the first agricultural vehicle, based on the first path planning constraint, to obtain a modified navigation path, so neither the first agricultural vehicle nor the second agricultural vehicle violates the first path planning constraint, and so the first agricultural vehicle and the second agricultural vehicle avoid the obstacle as the first agricultural vehicle follows the modified navigation path and as the second agricultural vehicle stays within the spatial relationship of the first agricultural vehicle; and controlling the first agricultural vehicle to follow the modified navigation path.

11. The computer implemented method of claim 10, wherein generating thea first path planning constraint comprises:

computing an obstacle offset corresponding to the obstacle based on the obstacle characteristic, the obstacle offset defining a boundary around at least a portion of the obstacle.

12. The computer implemented method of claim 10, wherein identifying the turning radius comprises:

computing thea turning radius corresponding to the second agricultural vehicle.

13. The computer implemented method of claim 12, wherein computing the turning radius comprises:

accessing machine information corresponding to the second agricultural vehicle and indicating capabilities of the second agricultural vehicle;

identifying a weight and a speed of the second agricultural vehicle; and computing the turning radius of the second agricultural vehicle based on the capabilities, the weight, and the speed of the second agricultural vehicle.

14. The computer implemented method of claim 13 and further comprising:

identifying a terrain characteristic indicative of terrain proximate the obstacle.

15. The computer implemented method of claim 14, wherein computing the turning radius comprises:

computing the turning radius corresponding to the second agricultural vehicle based on the terrain characteristic.

16. The computer implemented method of claim 10 and further comprising:

identifying a destination characteristic of a destination of the second agricultural vehicle;

generating a second path planning constraint based on the destination characteristic; and generating a second navigation path for the second agricultural vehicle based on the second path planning constraint.

17. An agricultural system, comprising:

one or more processors;

memory storing instructions executable by the one or more processors that, when executed by the one or more processors, configure the one or more processors to:

navigate a first agricultural vehicle along a navigation path through a field;

automatically control a second agricultural vehicle to stay within a spatial relationship of the first agricultural vehicle:

identify an obstacle characteristic of an obstacle in the field;

identify a turning radius corresponding to the second agricultural vehicle;

modify the navigation path off the first agricultural vehicle, based on the obstacle characteristic and the turning radius, to obtain a modified navigation path, so that the first agricultural vehicle and the second agricultural vehicle avoid the obstacle as the first agricultural vehicle follows the modified navigation path and as the second agricultural vehicle stays within the spatial relationship of the first agricultural vehicle; and control the first agricultural vehicle to follow the modified navigation path.

18. The agricultural system of claim 17, wherein the instructions, when executed by the one or more processors, configure the one or more processors to:

access machine information corresponding to the second agricultural vehicle;

identify capabilities of the second agricultural vehicle based on the machine information; and compute the turning radius corresponding to the second agricultural vehicle based on the capabilities of the second agricultural vehicle.

19. The agricultural system of claim 18, wherein the instructions, when executed by the one or more processors, configure the one or more processors to:

obtain an indication of a weight of the second agricultural vehicle;

identify an indication of a speed of the second agricultural vehicle in an area proximate the obstacle; and compute the turning radius corresponding to the second agricultural vehicle based on the weight and the speed of the second agricultural vehicle.

20. The agricultural system of claim 17, wherein the instructions, when executed by the one or more processors, configure the one or more processors to:

obtain an indication of terrain in an area proximate the obstacle; and compute the turning radius corresponding to the second agricultural vehicle based on the terrain proximate the obstacle.

* * * * *